Feb. 15, 1966 W. G. ANDERS ETAL 3,235,319

ARTICLE STORAGE EQUIPMENT

Filed Dec. 2, 1963 9 Sheets-Sheet 1

INVENTORS.
WALTER G. ANDERS
BENJAMIN W. WOODWARD
JOHN M. STOKES

BY

ATTORNEY

INVENTORS.
WALTER G. ANDERS
BENJAMIN W. WOODWARD
BY JOHN M. STOKES

ATTORNEY

ARTICLE STORAGE EQUIPMENT

INVENTORS.
WALTER G. ANDERS
BENJAMIN W. WOODWARD
BY JOHN M. STOKES

[signature]
ATTORNEY

Feb. 15, 1966 W. G. ANDERS ETAL 3,235,319

ARTICLE STORAGE EQUIPMENT

Filed Dec. 2, 1963 9 Sheets-Sheet 4

INVENTORS.
WALTER G. ANDERS
BENJAMIN W. WOODWARD
JOHN M. STOKES

BY

ATTORNEY

Feb. 15, 1966

W. G. ANDERS ETAL 3,235,319

ARTICLE STORAGE EQUIPMENT

Filed Dec. 2, 1963

9 Sheets-Sheet 5

INVENTORS.
WALTER G. ANDERS
BENJAMIN W. WOODWARD
BY JOHN M. STOKES

ATTORNEY

INVENTORS.
WALTER G. ANDERS
BENJAMIN W. WOODWARD
JOHN M. STOKES

BY [signature]
ATTORNEY

INVENTORS.
WALTER G. ANDERS
BENJAMIN N. WOODWARD
JOHN M. STOKES
BY [signature]
ATTORNEY Feb. 15, 1966 W. G. ANDERS ETAL 3,235,319

ARTICLE STORAGE EQUIPMENT

Filed Dec. 2, 1963

9 Sheets-Sheet 8

INVENTORS.
WALTER G. ANDERS
BENJAMIN W. WOODWARD
BY JOHN M. STOKES

ATTORNEY

INVENTORS.
WALTER G. ANDERS
BENJAMIN W. WOODWARD
JOHN M. STOKES

BY [signature]
ATTORNEY

3,235,319
ARTICLE STORAGE EQUIPMENT

Walter G. Anders and Benjamin W. Woodward, Tonawanda, and John M. Stokes, North Tonawanda, N.Y., assignors to Sperry Rand Corporation, New York, N.Y., a corporation of Delaware Filed Dec. 2, 1963, Ser. No. 327,193
17 Claims. (Cl. 312—223)

The present invention relates to article storage equipment and more particularly to means for extracting an article or article carrying container from a support member and for restoring the article or container to position on the support member after use.

In certain container supporting or storage devices, as for example, certain mechanized file units having a plurality of carriers mounted on a conveyor, it is well known to arrange containers, such as card trays, in side-by-side relationship on the shelf of each carrier. An operator, through operation of the conveyor, brings a selected carrier to a stop position at a work station arranged adjacent an access opening in the file unit. The operator then reaches into the access opening and manually withdraws a desired card tray out from the carrier on to a posting table at the work station. After the operator is finished with his work relative to the withdrawn card tray, he returns the card tray to the carrier by pushing the card tray back on to the carrier shelf preparatory to the selection of another carrier. Various known safety devices are usually provided to prevent accidental operation of the conveyor especially when the operator reaches within the access opening of the unit to remove or replace a card tray on the shelf of a carrier. Satisfactory use has been made of these mechanized file units, although in the course of performing work therefrom over a sustained period of time, an operator becomes fatigued from the repeated pulling and pushing of the trays off and on to the carriers. Fatigue quickly sets in, especially when the card trays are heavy with a full complement of material, such as index cards stored therein.

It is an object of this invention to provide article storage equipment which includes novel means for withdrawing an article carrying container from a support member.

Another object is to provide article storage equipment which includes novel means for withdrawing ar article carrying container from a support member and which means includes means to return the container to the support member after use.

Another object is to provide a versatile and novel mechanism for withdrawing articles and/or article carrying containers from either stationary or movable support members.

A further object is to provide novel mechanism for withdrawing article carrying containers from movable carriers of a mechanized file and wherein such mechanism is inoperable to withdraw the containers during movement of the carriers.

Still another object is to provide novel extractor means including magnet means for automatically withdrawing a selected article carrying container from a selected carrier of a mechanized file unit upon positioning of the selected carrier in an access opening in the unit and which means further include means to restore the article carrying container to position on to the carrier after use or upon selection of another carrier positioned away from the access opening.

A still further object is to provide novel circuit means for controlling operation of a novel container extractor means and which extractor means includes magnet means to withdraw an article carrying container from the shelf of a carrier of a mechanized file unit and which circuit means are operable to effect restoration of the container to the shelf after use or upon selection of another container.

A still further object is to provide novel extractor means for automatically withdrawing containers from the carriers of a mechanized file unit wherein the carriers are provided with retractable container retaining means.

The present invention broadly comprehends a novel extractor device for withdrawing one or more articles or article carrying containers from a support member. In one embodiment thereof, the novel device is adapted for use with a mechanized file unit wherein a plurality of carriers having article carrying containers stored thereon are mounted on a conveyor for movement to and from a work station adjacent an access opening in the file unit. The novel extractor device includes a table unit which is arranged at the front of the file unit. A bar assembly is mounted on the table unit and extends across the front of the access opening. Motor driven means are provided for moving the bar assembly toward or away from the access opening. Electromagnet means are carried by the bar assembly and means are provided to selectively energize the electromagnet means during movement of the bar assembly to the carrier whereby one or more selected containers of the carrier positioned at the access opening are attracted to and coupled to the bar assembly. The bar assembly withdraws the coupled container or containers from the carrier and is moved in an opposite direction, away from the access position, to a posting position on the table and the motor is stopped and the electromagnet means deenergized. The bar assembly is further reoperable to move toward the access opening to return the container to the carrier after use. Circuit means and switch means are provided to control the operation of the electromagnet means and to control movement of the bar assembly toward and away from the access opening to obtain precise operation of the novel device. The invention further contemplates additional interlock and pulsing means whereby the circuit means is incorporated into the circuit of a mechanized file unit whereby a selected carrier is brought to position in the access opening and a selected container withdrawn from the carrier automatically through operation of the conveyor controls.

The above and other objects and advantages of the present invention will appear more fully hereinafter from a consideration of the detailed description which follows taken together with the accompanying drawings wherein one embodiment of the invention is illustrated.

Figure 2:
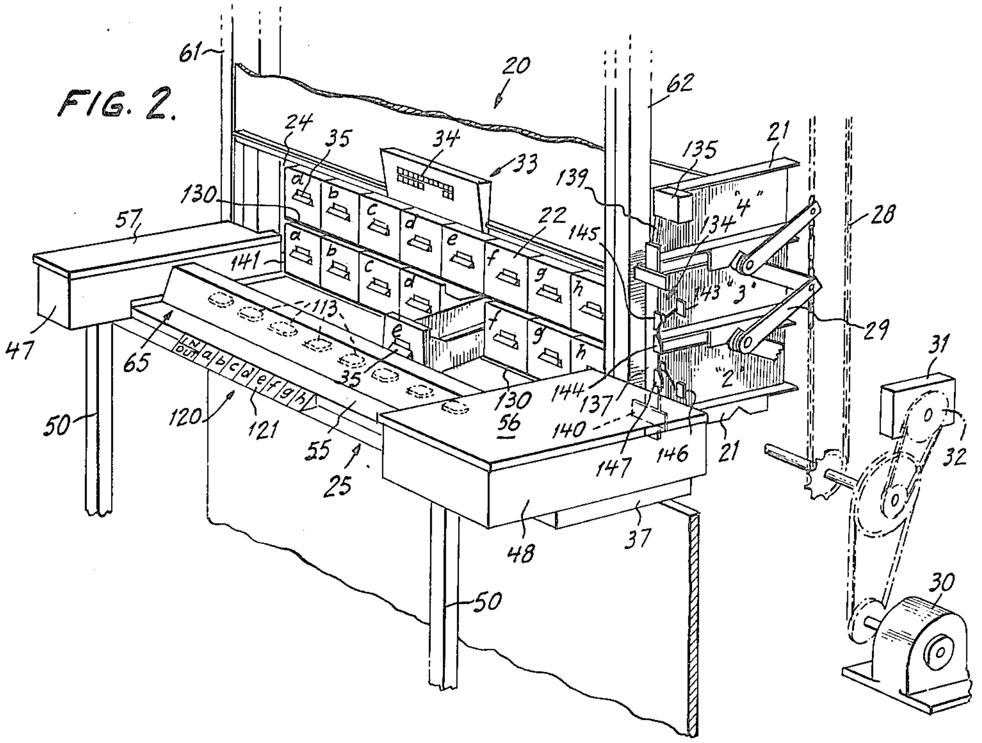
FIG. 2 is an enlarged front fragmentary perspective view of the file unit shown in FIG. 1 with a side wall of the file unit removed to show diagrammatically the conveyor system of the file unit.
Figure 1:
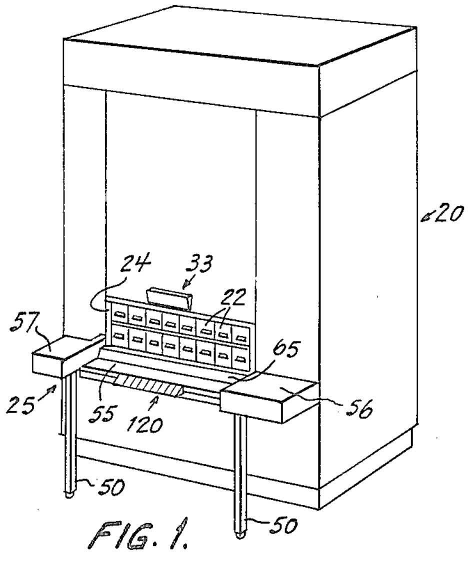
FIG. 1 is a perspective view of a mechanized file unit wherein the novel extractor device of the present invention is embodied in a posting table attached to the file unit.

Referring now to the drawings, for a more detailed description of the present invention and more particularly to FIGS. 1 and 2 wherein one embodiment is clearly illustrated, a cabinet type conveyor driven file unit is generally indicated by the reference numeral 20. A plurality of carriers 21 (FIG. 2 only three shown and numbered "2," "3" and "4," respectively) are housed within file unit 20 and a plurality of article carrying containers such as card trays 22 are supported in side-by-side relationship on a supporting shelf portion 23 (FIG. 4) of each carrier. Access to carriers 21 is provided through an opening 24 (FIGS. 1 and 2) at the front of file unit 20 adjacent a posting table 25. Carriers 21, as shown diagrammatically in FIG. 2, are suspended from an endless conveyor 28 by carrier arms 29 connected at one end to a carrier 21 and at the other end to conveyor 28. Carriers 21 are moved either up or down, as viewed from FIG. 2, in a well known manner, whereby a selected carrier 21 is positioned at the work station in access opening 24 adjacent posting table 25 by means of a conveyor drive mechanism which includes a sprocket-chain-driving reversible motor 30 diagrammatically shown at the lower right of file unit 20 in FIG. 2. Motor 30 is operable through control circuit means, shown as a box designated 31 and commutator 32 in FIG. 2, in a well known manner and such as described in U.S. Patent No. 3,105,727 issued October 1, 1963 and entitled "Mechanized Cabinet Type File." As clearly disclosed in the mentioned patent, the control circuit means 31 and commutator 32 is governed by use of a keyboard 33 mounted on file unit 20 above access opening 24, and which keyboard 33 is provided with carrier selector push buttons 34 having numerals (not shown) thereon corresponding to the numbers on carriers 21.

It will be readily apparent therefore that with a carrier 21 positioned at access opening 24, for example, carrier "2," as shown in FIG. 2, that in order to manually withdraw a selected card tray 22 from carrier "2," an operator grasps a pull member 35 on the front of the selected card tray 22 and pulls the selected card tray 22 out on to table 25 to a posting position (as shown with respect to tray "*e*" in FIG. 2). The operator then works out of the withdrawn card tray 22, and when the operator is finished with his work, he pushes the card tray back on to the carrier 21.

Figure 10:
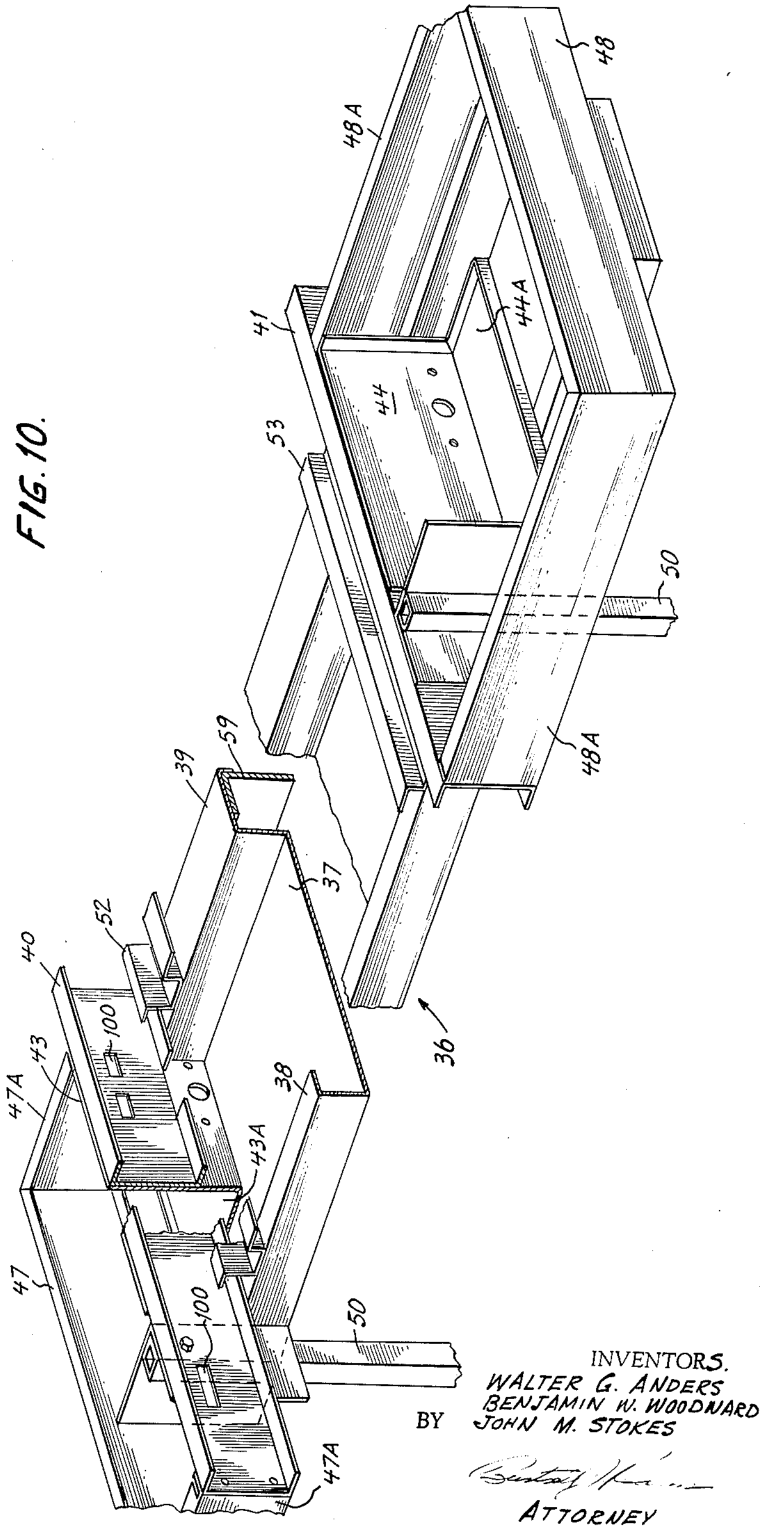
FIG. 10 is a perspective view of the frame of the posting table.

The present invention contemplates incorporating novel extractor means positioned on table 25 for automatically withdrawing and restoring the card trays 22 from a carrier 21. To this end, table 25 (FIGS. 1, 2 and 10) is provided with a frame 36 (FIG. 10) which includes a longitudinally extending rectangular pan member 37 having front and rear flanged portions 38 and 39 respectively, provided on the upper longitudinal edges thereof. A pair of transversely extending vertically disposed C-shaped channel supporting members 40 and 41 are mounted on pan 37 and have portions rigidly fastened to said front and rear flanged portions 38 and 39 of pan 37 by any suitable means such as by welding. Spaced supporting bracket members 43 and 44, respectively, are provided for channel members 40 and 41 and which bracket members 43 and 44 are secured to one side of each channel member 40 and 41 in any suitable manner. Brackets 43 and 44 have angled bottom portions 43A and 44A, respectively, overlying pan 37. Frame 36 further includes vertical C-shaped apron members 47 and 48 (FIGS. 2 and 10) provided at each end of table 25 with the arms of each apron 47 and 48 (FIG. 10) having flanged portions **47*a* and 48*a*, respectively (FIG. 10), secured to said adjacent vertical channel members 40 and 41. Spaced tubular leg members 50 are provided for supporting the front of table 25 and the legs 50 are each fastened to a channel member 40 and 41 in any suitable manner, as for example by bolts (not shown). In addition, frame 36 includes transverse horizontal C-shaped channel members 52 and 53 fastened to the front and rear flanges 38 and 39 of pan 37 by any suitable means, and which members 38 and 39 are arranged adjacent said vertical channel members 40 and 41 to support thereon a rectangular cover member 55 for pan 37 (FIGS. 1, 3, 4 and 5). Additional rectangular cover members 56 and 57 (FIGS. 1 and 2) are provided over aprons 47 and 48, and spaced side panels 58 are provided for covering vertical channel members 40 and 41 to thereby provide a completed casing for table 25** as shown in FIGS. 1 and 2.

In order to mount table 25 on file unit 20, an L-shaped angle member 59 (partially shown in FIGS. 3, 4, 5 and 10) is provided at the front of file unit 20 and extends across the lower portion of access opening 24. The opposite ends of angle member 59 are secured to file unit 20, such as by bolts 60 (FIG. 3) which are threaded through the end of angle member 59 and then through an adjacent vertical upright member 61 and 62 (FIGS. 2 and 3) of file unit 20. Bolts 60 (FIG. 3) are fastened to said upright members 61 and 62 by nuts 60A. Rear flanged portion 39 of pan 37 is disposed on angle member 59 and is secured thereby in any suitable manner as bolt-nut means 60B (FIGS. 4 and 5), thereby securely attaching table 25 to file unit 20.

Figure 3:
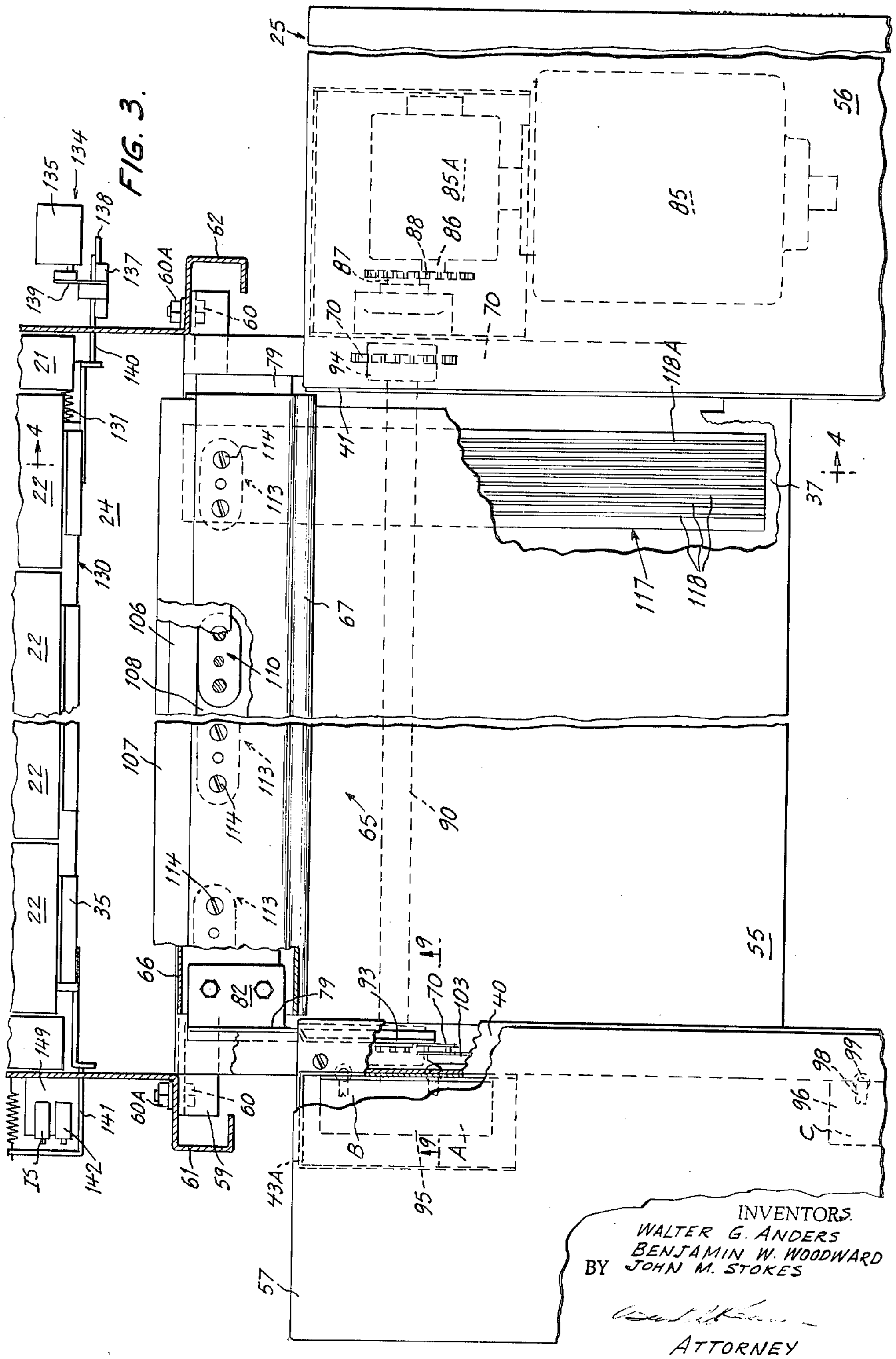
FIG. 3 is a fragmentary sectional plan view of the posting table of FIG. 1 showing the novel extractor device in its start position.

As clearly seen in FIGS. 1, 2 and 3, a bar assembly 65 is provided on table 25 and extends across table 25 between the spaced vertical channel members 40 and 41 (FIGS. 3 and 6) of frame 36 spanning the width of access opening 24. Bar assembly 65 includes an inner elongated S-shaped supporting frame member 66 (FIGS. 3, 4 and 5) preferably made of a non-magnetic material such as aluminum. In addition, an outer elongated C-shaped cover member 67, also formed of a non-magnetic material, is provided over supporting frame 66 and is fastened thereto in a suitable manner, whereby bar assembly 65 is provided with a casing open to the access opening 24.

Figure 6:
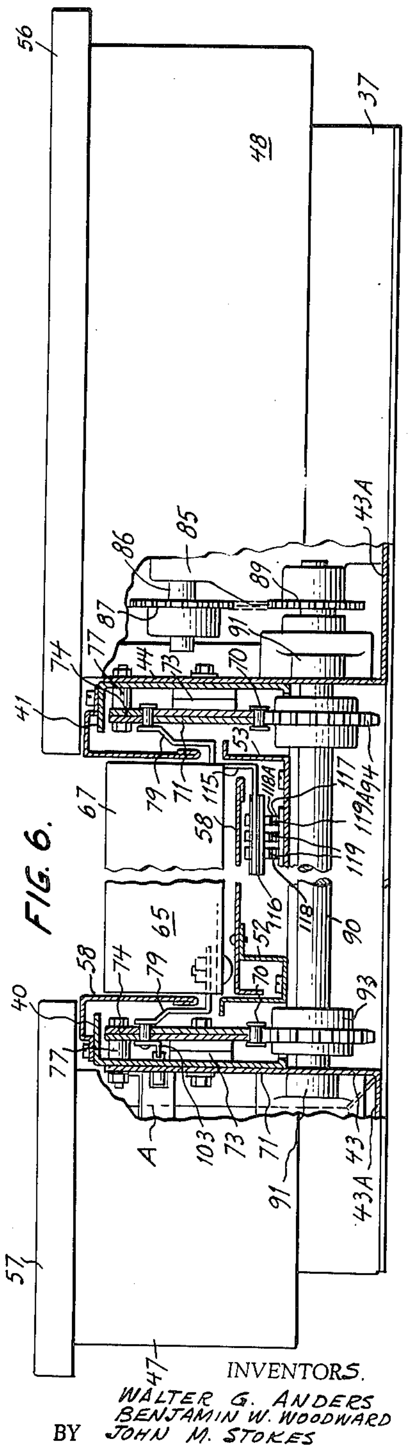
FIG. 6 is a front elevational view of the posting table with parts of the table casing broken away to show interior portions of the table.

Means are provided for mounting bar assembly 65 (FIG. 3) for movement toward and away from access opening 24 and includes a pair of spaced roller chains 70 (FIGS. 3, 4, 7 and 8) each arranged at an opposite end of bar assembly 65. Chains 70 are each carried in an identical manner by the spaced channel members 40 and 41 of table frame 36. As shown in FIGS. 7 and 8, with respect to channel member 40, roller chain 70 is trained about guide plates 71 secured to channel member 40. Guide plates 71 are spaced a suitable distance from the adjacent wall of its channel member 40 or 41 by washers 73, as seen in FIG. 6, whereby a roller chain 70 does not contact the adjacent wall of its supporting channel member 40 or 41 during movement of the chain around guide plates 71. In addition, elongated guide bars 74 (FIGS. 6 and 7) are secured to each channel member 40 and 41 above roller chains 70 by any suitable means and are spaced from the wall of its adjacent channel member by washers 77. Guide bars 74 bear against the roller chains 70 and together with guide plates 71 form a track for roller chains 70. Bar assembly 65 is suspended by the spaced roller chains 70 over cover 55 of table 25 (FIG. 6) by a pair of identical, but spaced, L-shaped bracket members 79 which are located at the opposite ends of bar assembly 65. Each bracket 79 as clearly seen in FIG. 7 with respect to bracket 79 at the left of bar assembly 65 has a main body portion riveted as at 80 to a bar 81 which is carried by spaced links of roller chain 70. An integral foot portion 82 (FIG. 7) of bracket 79 extends into an adjacent open end of bar assembly 65 and is secured thereto by bolts 83 which pass through the bottom (FIGS. 4, 5 and 6) of bar assembly cover 67, through supporting frame 66 and then through foot portion 82 of bracket 79 to which bolts 83 are then secured by nuts 83A.

Figure 4:
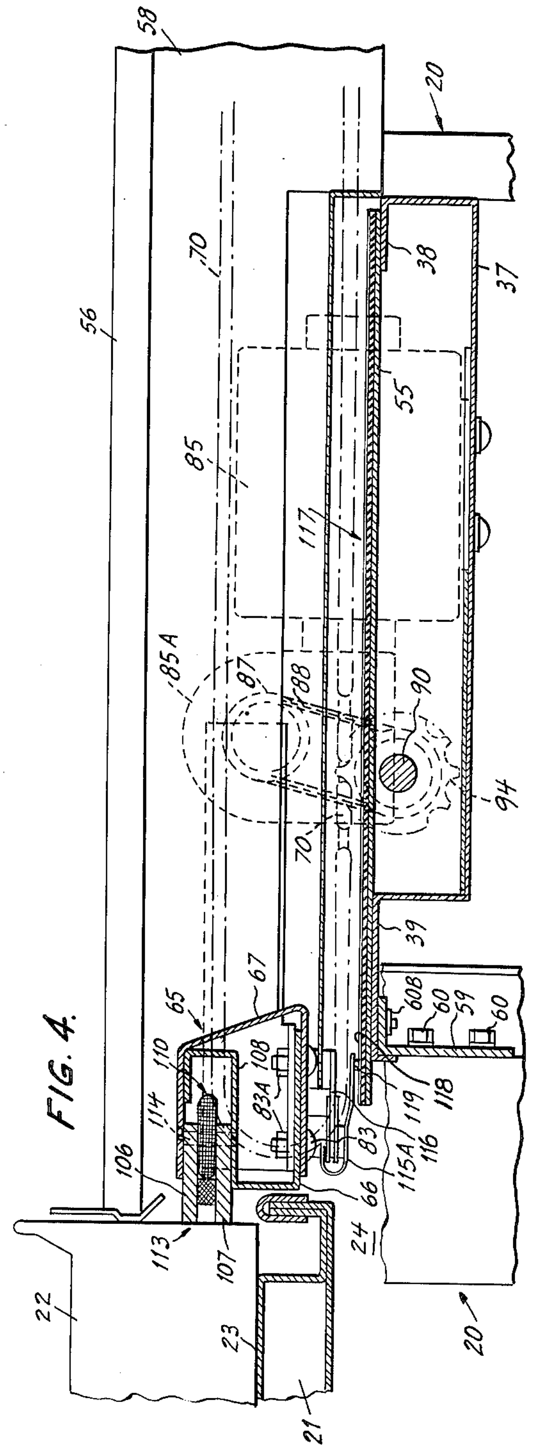
FIG. 4 is a fragmentary sectional view taken on the line 4—4 of FIG. 3, but showing the extractor device in a restoring or retracting position.
Figures 5, 7, 8:
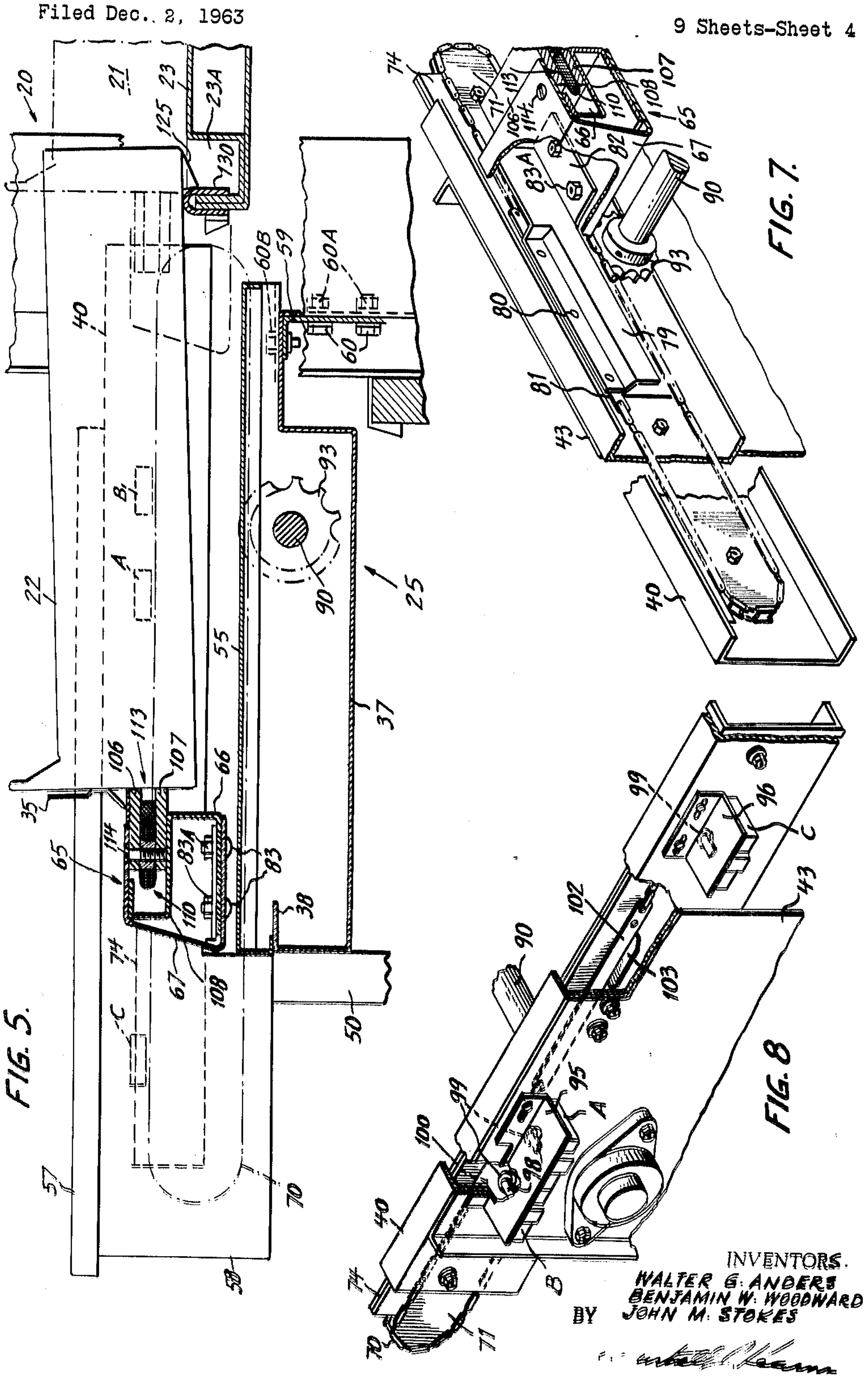
FIG. 5 is a partly sectional view of the extractor device and posting table and shows a container of the file unit in posting position.
FIG. 7 is a fragmentary perspective view of the mounting structure for the extractor device at the left in FIG. 6.
FIG. 8 is a fragmentary perspective rear view of the mounting structure shown in FIG. 8.

Means are provided to drive chains 70 whereby bar assembly 65 is moved toward and away from access opening 24 and which means include a reversible D.C. motor 85 diagrammatically shown in FIGS. 3, 4 and 6. Motor 85 is securely bolted to pan 37 and frame portion 44A of table frame 36 beneath cover member 56 at the right of access opening 24 (FIG. 3). Motor 85 (FIGS. 3 and 6) is provided with a gear reduction unit 85A which has an output shaft 86 carrying a sprocket gear 87. A chain 88 is trained about sprocket gear 87 on output shaft 86 and then about a sprocket gear 89 (FIG. 6) secured to one end of an elongated shaft 90. Shaft 90 extends across pan 37 beneath the vertical channel members 40 and 41 and is rotatably mounted in spaced bearing housings 91 which are secured to bracket members 43 and 44 of frame 36. As shown in FIG. 6, shaft 90 is provided with spaced drive sprocket wheels 93 and 94, each in mesh with an associated spaced roller chain 70 carrying bar assembly 65. Operation of motor 85 therefore causes shaft 90 to be rotated to drive sprocket wheels 93 and 94 to effect movement of roller chains 70 about guide plates 71 to move bar assembly 65.

To control operation of motor 85 and the direction of movement of bar assembly 65 toward and away from access opening 24, mechanical switches A, B and C are provided on one side of channel member 40 (FIGS. 3 and 8). Switches A and B are carried by a bracket 95 (FIG. 8) attached to channel member 40 adjacent access opening 24 and switch C is carried by a bracket 96 at the outer end of channel member 40. Each of the switches A, B and C include an arm 98 provided with a roller 99 and which arm 98 and roller 99 extend through openings 100 (FIG. 9) in the wall of channel member 40. In order to control actuation of switches A, B and C, a bar 102 (FIGS. 3, 5, 8 and 9) is attached to spaced links of roller chain 70 of channel member 40. Bar 102 is provided with a cam surface 103 arranged in the same plane as rollers 99 of switches A, B, C during movement of bar assembly 65. In the start position (FIGS. 3 and 9) of bar assembly 65, cam 103 engages roller 99 of switch A to actuate switch A. As bar assembly 65 moves away from switch A toward access opening 24, switch A is released by cam 103 to unactuated condition and cam 103 then engages and actuates switch B (FIG. 3) to reverse the direction of movement of bar assembly 65 as will be explained and as it is moved to switch C. Cam 103 then actuates switch C to interrupt the operation of motor 85 in a manner to be hereinafter fully described.

Means are provided on bar assembly 65 to withdraw a desired card tray 22 from a carrier 21. Said means are mountd on bar assembly supporting frame 66 (FIGS. 3, 4 and 5) and include spaced upper and lower elongated bar members 106 and 107 of magnetizable material extending the longitudinal length of a horizontally disposed intermediate leg 108 of frame 66. A plurality of energizing coil and core assemblies 110 (FIGS. 2, 3, 4 and 5) equal in number to the number of card trays 22 on a carrier 21 are interposed between members 106 and 107. Coil and core assemblies 110 are spaced at intervals along leg 108 in alignment with a card tray 22. The portions of bar members 106 and 107 in engagement with energizing coil and core assemblies 110 serve as pole pieces for the assemblies 110 to provide individual and spaced electromagnets 113 for each card tray. Pole pieces 106 and 107 and coil and core assemblies 110 are secured to bar assembly 65 in any suitable manner such as by screws 114 (FIGS. 4 and 5). The leading edges (FIG. 3) of each bar 106 and 107 extends outwardly of bar assembly 65 beyond cover 67. Each electromagnet 113 is in alignment with the front of a card tray 22 disposed on the carrier 21 positioned in the access opening 24, whereby each electromagnet 113 abuts against the front of a card tray 21 when bar assembly 65 is moved into access opening 24 to the position shown in FIG. 4. Card trays 22 are of metal construction with at least the portion of the face in alignment with electromagnets 113 made of magnetizable material.

Referring now to FIGS. 4 and 6, a bracket 115 is shown attached to the lower right end of bar assembly 65 and which bracket 115 has a foot portion 116 suspended over a commutator track 117 provided on horizontal angle member 53 of table frame 36. Track 117 is provided with a plurality of conductive metallic strips 118 equal in number to the number of electromagnets 113 and card trays 22. Foot portion 116 of bracket 115 is provided with a clip 115A to which are secured a plurality of conductor brushes 119 (only two shown in FIG. 6). Each brush 119 has an individual wire connection (not shown) with an electromagnet 113 of bar assembly 65, whereby a selected strip 118, when current flows through it, will establish a circuit through brush 119 to a coil and core assembly 110 of a corresponding electromagnet 113. An additional conductor strip 118A is provided on track 117 having in contact therewith a brush 119A having a wire series connection (not shown) with all the electromagnets 113, whereby when current flows through strip 118A, all the electromagnets 113 are energized. Brushes 119 and brush 119A are in continuous contact with strips 118 and 118A, respectively, during movement of bar assembly 65 toward and away from access opening 24.

Referring now to FIGS. 1 and 2, a keyboard 120 is arranged on table 25. Keyboard 120 is provided with card tray selecting means including a plurality of push buttons 121 marked "*a*" to "*h*" inclusive, corresponding to card trays 22 as marked "*a*" to "h" inclusive, from left to right in FIG. 2 on a carrier 21. Push buttons 121 are of the type, although not limited thereto, that when one is depressed, it is mechanically locked or self-latched in closed position and then released, for example, when another push button 121 is depressed in a conventional manner.

In addition, an additional self-latching push button marked "ALL" together with push buttons marked "IN" and "OUT" are provided on keyboard 120, together with an "ON-OFF" switch for turning power on and off. Push buttons "IN" and "OUT" are spring returned and are of the type that are not self-latching.

Figure 11:
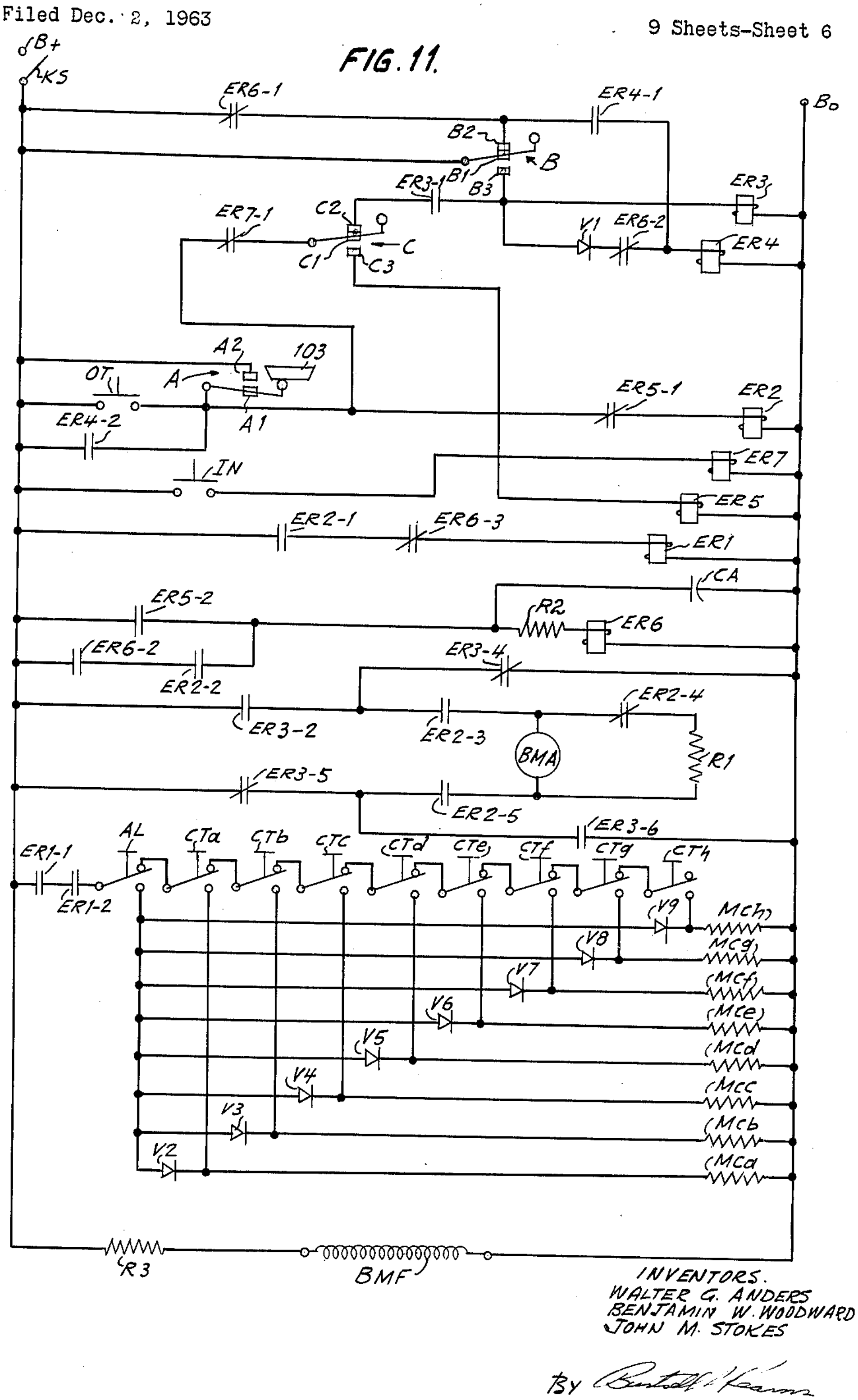
FIG. 11 is a schematic diagram of the power and control circuit for operating the extractor device independently of the file unit controls in across-the-line form.

Referring now to FIG. 11, circuitry is disclosed therein for controlling and effecting operation of bar assembly 65 as a unit independent of the operation of file unit 20, whereby bar assembly 65 is moved to access opening 24 to engage card trays 22 and couple to a selectively energized electromagnet 113 card trays 22 to be withdrawn from carrier 21. In FIG. 11, unidirectional power is supplied from a conventional source of electrical energy (not shown) over supply lines B+, B*o* to the extractor power and control circuits illustrated. BMA designates the bar assembly motor armature of motor 85 (FIG. 3), while MF designates the motor field windings thereof. Push button switch contacts "IN" and "OUT" for control of bar assembly motor 85 (FIG. 3) are designated IN and OT respectively in FIG. 11. The contacts of push buttons 121 "*a*" to "*h*" mentioned hereinbefore with regard to FIG. 2 are shown as connected in series in FIG. 11, and the contacts thereof are designated CT with suffixes "*a*" to "*h*" appended thereto to correspond to its mentioned push button 121. The "ALL" push button contacts are also connected in series with switch contacts CT*a* to CT*h* and are designated AL. The magnet coils 110 of electromagnets 113 are each designated MC with letter suffixes "*a*" to "*h*" inclusive, corresponding to the letter of card trays 22 (FIG. 1) in alignment therewith, appended thereto; and to their corresponding activating push buttons "*a*" to "*h*" inclusive.

Electromagnetic relays used in the controls are designated ER followed by a number suffix. These identifying letters and numerals are applied to the coils of the relays and with additional hyphenated suffix numerals appended thereto, are applied to the contacts of the relays to differentiate between different sets of contacts on the same relay; all relay contacts being shown for the deenergized condition of the relays.

Resistors are generally designated R, capacitors CA, rectifiers V, with numeral suffixes being appended thereto to distinguish circuit components one from the other. KS designates the contacts of "ON-OFF" push button 121 (FIG. 2) connected in supply line B+ (FIG. 11) for disconnecting and connecting the power from the circuit. An R-C timing circuit for relay ER6 is shown consisting of resistor R2 and capacitor CA. The values of timing resistor R2 and timing capacitor CA are selected so as to prevent release of relay ER6 for a predetermined time from the removal of applied power to the relay energizing coil of relay ER6 for purposes to be explained.

The stationary contact of single throw, single pole cam actuated switch A is designated A2 with the movable contact designated A1. Movable contacts of cam actuated single pole, double throw switches B and C are designated B1 and C1, and stationary contacts designated B2–B3 and C2–C3, respectively. The contacts of switches B and C are shown in their normal unactuated condition with the contacts of switch A actuated to open condition by cam 103 (FIG. 9), as diagrammatically shown in FIG. 11 with bar assembly 65 at start position on table 25 (FIGS. 1 and 3).

Assume that it is desired to use the described extractor means including bar assembly 65 and table 25 as a unit independently of the operation of the conveyor of file unit 20. Under such conditions, table 25 is attached to file unit 20 in the manner previously described and the operation of bar assembly 65 is controlled by "IN" and "OUT" push buttons and through the individual card tray push buttons 121 on keyboard 120 through the circuitry shown in FIG. 11. Under such conditions, next assume that conveyor 28 (FIG. 2) is at rest with a carrier 21, for example, carrier "2" positioned at access opening 24 adjacent table 25.

Under the above conditions, bar assembly 65 is at its start position in which switch A is actuated (FIG. 3) with switches C and B in unactuated condition and cam 103 maintaining switch A actuated as was previously stated. Next, assume that the operator desires to bring a selected card tray 22, for example, card tray "*c*" from carrier "2" out on to table 25. Under such conditions, he closes "ON" switch closing switch contact KS (FIG. 11) to supply power to the bar assembly power and control circuit, thereby energizing the field MF for motor 85 (FIG. 3). He then depresses and maintains depressed push button "OUT" (FIG. 2) closing "OUT" switch contacts (FIG. 11) and depresses card tray push button "*c*" which is self-latching as was previously stated, closing to register selection of card tray "*c*" by contact CT*c* preparing an energizing circuit for the magnet coil MC*c* (FIG. 11) and completing an energizing circuit from supply line B+ to B*o* for the coil of relay ER2; the latter circuit extending through closed contacts of manual switch KS, closed "OUT" switch contacts, normally closed contacts ER5–1 of relay ER5, through the coil of relay ER2 to supply line B*o*. Relay ER2, upon operation, closes its normally open contacts ER2–5 and ER2–3 and opens its normally closed contact ER2–4. Contacts ER2–5 and ER2–3, upon closing, complete an energizing circuit for armature BMA of the bar assembly motor (shown as 85 in FIG. 3), the latter circuit extending from line B+ to B*o* (FIG. 11) through normally closed contacts ER3–5 of relay ER3, presently closed contacts ER2–5, motor armature BMA, closed contacts ER2–3 and normally closed contacts ER3–4. Motor 85 (FIG. 3) upon rotation of armature BMA turns shaft 90 and sprockets 93 and 94 (FIG. 3) to drive chains 70 and bar assembly 65 toward access opening 24 of file unit 20. As bar assembly 65 is driven forward, cam 103 rides off switch A (FIG. 9) closing contacts A1–A2 (FIG. 11) establishing a second circuit to relay ER2 parallel to push button "OUT" contacts so that the operator now releases push button "OUT," relay ER2 remains energized through closed switch contacts A1–A2 and closed contacts ER5–1. Relay ER2 in addition to energizing motor armature BMA, as described, also closes its normally open contacts ER2–1 establishing an energizing circuit for the coil of relay ER1 from line B+ to B*o* through closed contacts ER2–1 and normally closed contacts ER6–3 of relay ER6. Relay ER1, upon operation, closes its normally open contacts ER1–1 and ER1–2 establishing a circuit from lines B+ to B*o*, through card tray selector switches AL, CT*a*, CT*b*, presently closed contacts CT*c* to energize the coil MC*c*. Energization of electromagnet 113 having coil MC*c* magnetizes only the pole portions of bar members 106 and 107 engaging the core and coil assembly 10 in alignment with card tray "*c*" without effect on the adjacent areas of said bar members. Bar assembly 65 continues forward until the leading edges of the electromagnets 113 extend over the lip of carrier "2" and with energized electromagnet 113 having coil MC*c* magnetizably coupled to the front of the aligned desired card tray "*c*" on carrier "2." Simultaneously, cam 103 (FIG. 4) engages and actuates switch B opening switch contacts B1–B2 (FIG. 11) and closing switch contacts B1–B3; thereby applying voltage to the coil of relay ER3 from line B+ through switch contacts B1–B3. Relay ER3, upon operation, closes normally open contacts ER3–1; and causes instantaneous reversal of the current through armature BMA through the closing of normally open contacts ER3–2 and ER3–6 and the opening of contacts ER3–5 and ER3–4, in the energizing circuit for armature BMA, thereby reversing the direction of movement of bar assembly 65 which now moves away from access opening 24 (FIG. 4) pulling card tray "*c*" from carrier shelf 23.

At the same time that relay ER3 (FIG. 11) is thus operated, positive voltage is applied to the coil of relay ER4 from line B+ to B*o* through closed switch contacts B1–B3, rectifier V1 and normally closed contacts ER6–2 of relay ER6. Relay ER4, upon operation, closes its normally open contacts ER4–2 establishing an alternate circuit to relay ER2 parallel to presently closed switch contacts A1–A2. In addition, relay ER4 closes its contacts ER4–1 establishing a self-holding circuit to the coil of relay ER4 through closed contacts ER6–1 of relay ER6 and closed contacts ER4–1.

As bar assembly 65 moves away from access opening 24 with tray "*c*," cam 103 disengages switch B to unactuated condition opening contacts B1–B3 and closing contacts B2–B1. However, a circuit is still maintained to the coil of relay ER3 through the said presently closed contacts ER4–2, normally closed contacts ER7–1 of relay ER7, closed contacts C1–C2 of switch C, and presently closed contacts ER3–1. As the bar assembly 65 continues its movement, cam 103 again reengages switch A opening contacts A1–A2, but without effect on the coil of relay ER2 which is maintained energized through closed contacts ER4–2, and ER5–1 allowing switch contacts A1–A2 to open with the movement of bar assembly 65 and the card tray "*c*" to the front of table 25 (FIG. 3) without opening the circuit to the coil of relay ER2 (FIG. 11). As cam 103 rides off switch A, contacts A1 and A2 reclose.

When tray "*c*" (FIG. 5) has been withdrawn to its full length on to table 25 by bar assembly 65, dimples 125 on the bottom thereof drop into channel 23A of carrier shelf 23 and engage the rear of a carrier lip 130 to prevent disengagement of card tray "*c*" from carrier "2" as shown in FIG. 5. Simultaneously, switch C is actuated by cam 103 opening switch contact C1–C2 (FIG. 11) and closing switch contacts C1–C3 establishing a circuit from line B+ to B*o* through closed contacts ER4–2, ER7–1 and C1–C3 to the coil of relay ER5. Relay ER5, upon operation, opens normally closed contacts ER5–1 in the energizing circuit of relay ER2 deenergizing the coil of relay ER2. Relay ER2, upon releasing, opens its contacts ER2–3, ER2–5 and closes contacts ER2–4 removing the armature BMA from power supply and applies dynamic breaking to the bar assembly 65 (FIG. 5) through the said closed contacts ER2–4 (FIG. 11) and resistor R1. In addition, relay ER2 opens contacts ER2–1 deenergizing the coil of relay ER1 which opens contacts ER1–1 and ER1–2 interrupting the circuit to energized coil MC*c* which deenergizes whereby card tray "*c*" is released. Relay ER5, in addition, closes contacts ER5–2 establishing a circuit to timing capacitor CA from line B+ to B*o* charging capacitor CA to full capacity for purposes to be hereinafter explained, and also energizes the coil of relay ER6. Relay ER6, upon operation opens contacts ER6–1 making the coil of relay ER4 dependent for voltage through closed contacts B1–B2 of switch B, and closed contacts ER4–1. In stopped outer position of bar assembly 65 at switch C, cam 103 maintains contacts C1–C3 closed maintaining the coil of relay ER5 energized. The operator then performs his work on the withdrawn card tray "*c*."

Next, assume the operator elects to return card tray "*c*" to carrier "2." Under such conditions, he now depresses and maintains depressed push button "IN" (FIG. 2) closing "IN" switch contacts (FIG. 11) and effecting an energizing circuit for the coil of relay ER7 from line B+ to B*o*. Relay ER7, upon operation, opens normally closed contacts ER7–1 interrupting the circuit to relay ER5 which releases and closes normally closed contacts ER5–1 re-establishing an energizing circuit for the coil of relay ER2 through presently closed contacts ER4–2 and closed contacts ER5–1, and also through closed contacts A1–A2 and ER5–1. When relay ER5 is released, it opens contacts ER5–2 interrupting the circuit to the coil of relay ER6. However, relay ER6 is maintained energized through the discharge of capacitor CA through timing resistor R2 to insure that relay ER6 is not released prior to the reoperation of relay ER2. Reoperation of relay ER2 closes contacts ER2–2 to maintain relay ER6 operative, whereby relay ER6 maintains contacts ER6–3 open preventing operation of relay ER1 on return movement of bar assembly 65 and thus insures that magnet coil MC*c* (FIG. 11) is not reenergized. Relay ER2 further upon reoperation closes contacts ER2–3, ER2–5 again establishing an energizing circuit for armature BMA through closed contacts ER3–5, ER2–5, ER2–3 and ER3–4, driving the bar assembly 65 and card tray "*c*" back toward carrier "2." Cam 103 releases switch C opening contacts C1–C3 and closing contacts C1–C2 thus preventing reoperation of relay ER5 when "IN" push button is now released by the operator to deactivate the coil of relay ER7 and without effect on the movement of bar assembly 65.

As bar assembly 65 moves forward, it pushes card tray "*c*" with it. During the return movement, cam 103 again actuates switch A opening contacts A1–A2, but without effect on relay ER2, since the coil of relay ER2 is maintained energized through presently closed contacts ER4–2 and normally closed contacts ER5–1. As cam 103 rides off switch A, contacts A1–A2 reclose. Bar assembly 65 pushes tray "*c*" back on to carrier "2" and simultaneously cam 103 reactuates switch B opening contacts B1–B2 and closing contacts B1–B3. Switch B, upon closing contacts B1–B3, interrupts the circuit to the coil of relay ER4 which releases and opens contacts ER4–2 and ER4–1, and reoperates relay ER3 which reverses the direction of current through armature BMA through the opening of contacts ER3–5, ER3–4 and the closing of contacts ER3–2 and ER3–6 in the circuit of armature BMA as described with regard to the out operation. Card tray "*c*" having been restored to carrier "2," the bar assembly proceeds away from access opening 24 towards its start position at switch A with cam 103 releasing switch B, reclosing contacts B1–B2, but without effect. The coil of relay ER3 is however thus made dependent for holding voltage through a circuit extending through closed contacts A1–A2, closed contacts ER7–1, C1–C2 and ER3–1. Cam 103 then engages switch A to open contacts A1–A2 to open the energizing circuit for the coil of relay ER2 which releases opening contacts ER2–3 and ER2–5 and closing contacts ER2–4 stopping the motor 85 with dynamic breaking in the manner previously described and stopping bar assembly 65 at switch A. Relay ER2 also opens contacts ER2–2 interrupting the circuit to coil of relay ER6 which deenergizes. In addition, opening of contacts A1–A2 interrupts the circuit to the coil of relay ER3 which releases, preparing the circuitry of FIG. 11 as described in condition preparatory to another cycling thereof.

Under the previous set of conditions, if it is assumed that the operator desires to withdraw all of the card trays 22 instead of one card tray 22 from carrier "2," then the operation is the same as previously described, except that instead of depressing a single card tray push button 121, the operator depresses push button "ALL," which closes contacts AL (FIG. 11) to prepare all of the magnet coils MC*a* to MC*h*, inclusive, for energization and which coils MC*a* to MC*h*, inclusive, all energize as the coil of relay ER1 is energized in the manner described. All of the electromagnets 113 inclusive therefore magnetically couple a card tray "*a*" to "*h*" to bar assembly 65 withdrawing all of said card trays from carrier "2" in the manner described for the removal of one card tray with the trays 22 restored to the carrier 21 in the manner described for the single tray through operation of the "IN" push button.

It is further contemplated to provide means to incorporate the described container extractor means with file unit 20, wherein the extractor means are automatically operable with the conveyor control means and wherein carriers 21 of file unit 20 are provided with retractable card tray retaining means of the type disclosed in pending U.S. patent application, Serial No. 296,694, filed July 22, 1963, and entitled "Article Carrying Conveyor Driven Equipment." As fully described in the mentioned application and as shown in FIGS. 1, 3, 4 and 5, it is desirable in certain mechanized filing equipment to provide a retaining bar or lip 130 across the front of each carrier 21 to obstruct movement of card trays 22 off a carrier shelf 23 during movement of the carrier to and from access opening 24. As brought out in the mentioned application, retaining lip 130 is urged to an upper position at the front edge of a carrier by spring member 131. A plunger mechanism 134 diagrammatically illustrated in FIG. 2 is provided for releasing lip 130 to a lower position when the carrier upon which it is mounted is brought to stop at access opening 24 by the conveyor control means 31.

Plunger mechanism 134 (FIG. 2) includes a small A.C. motor 135 mounted within file unit 20. A vertically movable retractor bar 137 is mounted on a fixed bracket 138 and is connected to plunger motor 135 by a crank arm connection 139. A plunger plate 140 (FIG. 3) is interconnected to retractor bar 137 whereby plate 140 is driven horizontally by bar 137 into access opening 24 to engage and release lip 130 to a lower position away from card trays 22 upon pulsing of plunger motor 135 through a pulsing circuit in the conveyor power and control circuit as will hereinafter be described. Lip 130 in lower position drives a second plunger plate 141 at the right of access opening 24 in FIGS. 2 and 3 to deactuate a switch 142 (FIG. 2) to open the circuit to motor 30 for conveyor 28. An additional mechanical switch 143 is operated by cams 144 and 145 on retractor bar 137 to control operation of plunger motor 135, and an additional switch 146 is controlled by a second cam 147 on retractor bar 137 to open a circuit to motor 30 of conveyor 28 when unactuated in a manner more fully described in the mentioned application and as to be hereinafter discussed.

Means are provided for adapting the novel extractor device including bar assembly 65 to a file unit of the type mentioned. A mechanical interlock switch IS is provided on the bracket 149 (FIG. 3) carrying said switch 142 of the retractable retaining means mechanism and which switch 143 is positioned for actuation by a spring returned plate 141 when a retaining lip 130 of a carrier 22 is restored to upper on card tray retaining position on a carrier 22.

Figure 12:
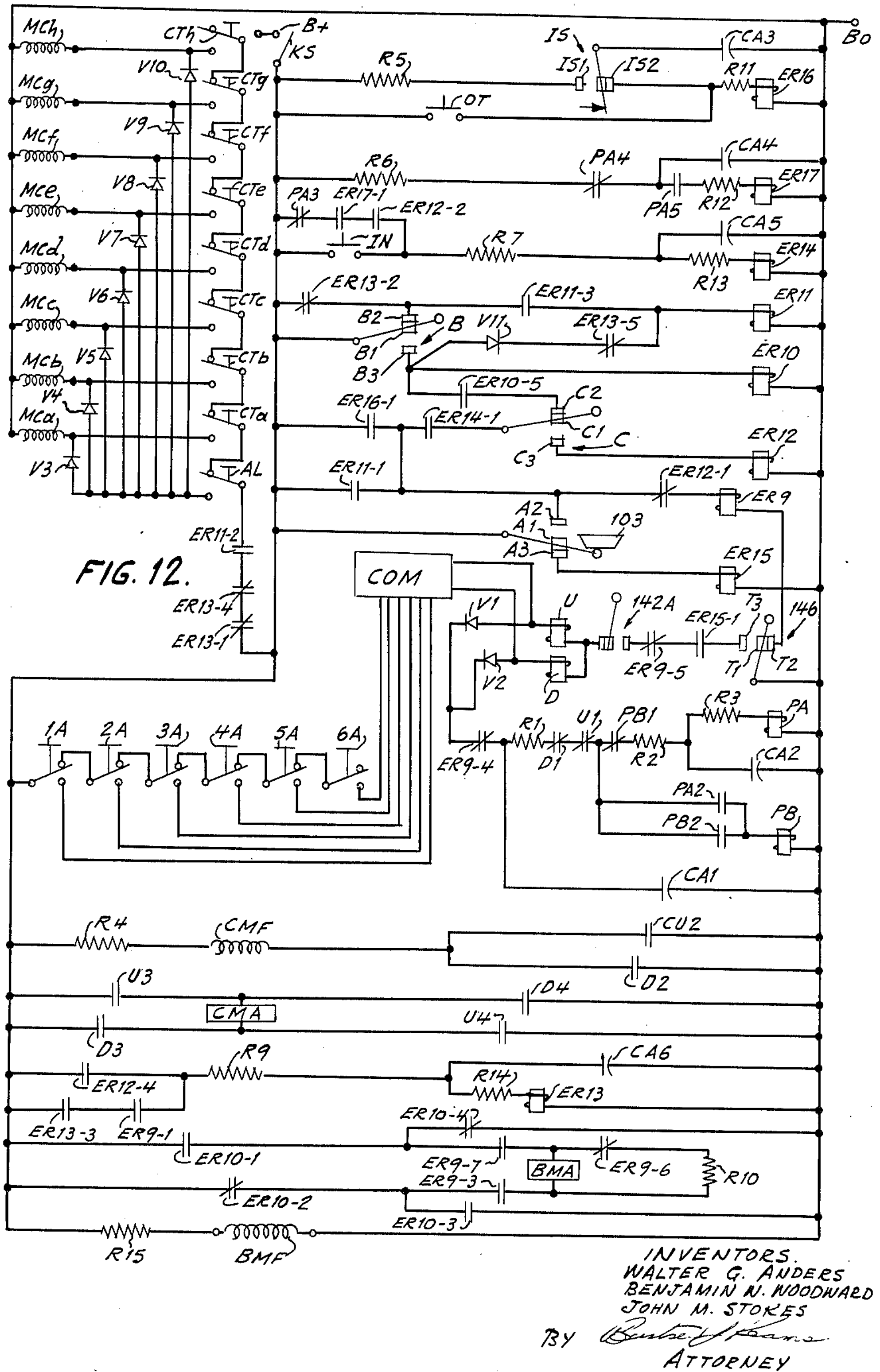
FIG. 12 is a schematic diagram of the power and control circuit for the extractor device as incorporated into the power and control circuit of a conveyor file device having a retractable card tray retaining means in across-the-line form.
Figure 13:
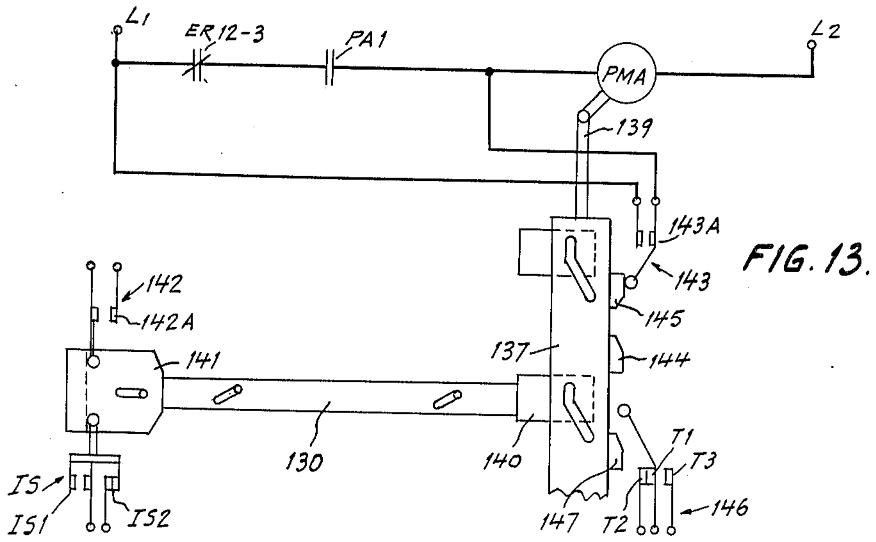
FIG. 13 is a diagrammatic representation of the retractable retaining means mechanism and circuitry therefor in across-the-line form.

Referring now to FIGS. 12 and 13, circuitry is disclosed for controlling and effecting operation of the extractor means, and which means are incorporated into the circuitry of a file unit having retractable tray retaining means, as discussed. In FIG. 12, unidirectional power is supplied from a conventional source of electrical energy, not shown, over supply lines B+, B*o* to the conveyor power and control circuits and to the extractor means power and control circuits incorporated therewith. CMA designates the motor armature (of conveyor motor 30 of FIG. 2) while CMF designates the motor field winding thereof. BMA designates the armature of bar assembly motor 85 and BMF the motor field winding thereof. Contacts 1A to 6A, inclusive, designates the contacts of push button switches for carriers 22 connected in series. It will be understood that any number of carrier push buttons may be connected in series depending upon the number of carriers 22 mounted by conveyor 28. Carrier push buttons 34 are self-latching and are mechanically locked until released by depression of another carrier button or other well known means. For purposes of simplicity, only six push button switch contacts are shown in FIG. 12. Further, commutator assembly is shown as a box designated COM in FIG. 12 and which commutator assembly operates in a known manner as set forth in the mentioned patent to prepare an energizing circuit for either the coil of conveyor directional relays U or relay D, and relays which control the movement of conveyor motor 30, counterclockwise or clockwise respectively in FIG. 2, whereby a carrier 22 is brought to access opening 24 by the shortest route on conveyor 28.

Electromagnetic relays used in the controls of conveyor motor 30 are designated as follows: U—up relay, D—down relay, PA—first pulsing relay, and PB—second pulsing relay. Electromagnetic relays used in the control of the bar assembly motor are designated as ER with suffix numerals appended thereto to differentiate one relay from the other. Suffix numerals are appended to the contacts of all the relays to differentiate between different sets of contacts of the same relay; all relay contacts being shown for the unoperated condition of their relays.

Resistors are designated R; capacitors CA; rectifiers V; with numeral suffixes being appended thereto to distinguish circuit components one from the other. KS designates a mechanical knife switch connected in supply line B+ for disconnecting and connecting power to the circuit.

Contacts C1, C2, C3; and B1, B2, B3 designate respectively the contacts of cam actuated mechanical single pole, double throw switches B and C (FIG. 8) respectively; switches B and C being shown in their normal unactuated condition with contacts C1 and B1 being movable and contacts C2, C3, B, B3 stationary. Single pole, double throw switch A is actuated by cam 103 as shown with bar assembly 65 at start position on table 25 (FIG. 3), with stationary contacts thereof designated A2, A3 and a movable contact designated A1. Contacts T1, T3 designate the stationary contacts of mechanical double throw switch 146 and T2 the movable contact thereof, and which switch is shown in unactuated condition; IS1 and IS2 designate the contacts of double throw contact of interlock switch IS and is also shown in an unactuated condition. The contacts of mechanical switch 142 are designated 142A with switch 142 in unactuated condition.

The coils of electromagnets 113 are each designated MC with a letter suffix "*a*" to "*h*," inclusive, corresponding to the letters of the card tray 22 on a carrier 21. Contacts of self-latching card tray push buttons 121 are designated CT with suffices "*a*" to "*h*" appended thereto, inclusive, and are shown as connected in series one with the other in FIG. 12. Contacts IN, OT and AL designate contacts of push buttons "IN," "OUT" and "ALL" respectively.

RC timing circuits are shown across the coils of relays ER16, ER17, ER14, ER13 and PA. The values of the timing resistors and timing capacitors in circuit with said relays are selected so as to delay the release of their respective relays for a predetermined time measured from the removal of applied power to the relay energizing coil for purposes to be hereinafter explained.

Referring to FIG. 13 alternating power from any suitable conventional source (not shown) is supplied over lines L1, L2 to the power and control circuit of plunger motor 135 (FIG. 2). In FIG. 13, PMA designates the armature of plunger motor 135, the motor field windings for purposes of simplicity being omitted. An energizing circuit may be completed for armature PMA (FIG. 13) through either normally closed contacts ER12–3 of extractor relay ER12 and normally open contacts PA1, or through contacts 143A of mechanical cam actuated switch 143 which is shown in actuated condition (contacts 143A open).

Retractor bar 137 (FIG. 2), plunger plates 140 and 141 and retractable retaining lip 130 are shown schematically in FIG. 13, wherein the mentioned elements bear the same numeral designations as in FIG. 2. Retractor bar 137 is shown in its lower limit position with a retaining lip 130 lowered. Under such conditions, mechanical switches 142, 146 and IS are unactuated and mechanical switch 143 actuated.

Next, assume that it is desired to use extractor means including bar assembly 65 and supporting table 25 as previously described as a unit to operate automatically with the operation of the conveyor of file unit 20 through the circuitry shown in FIGS. 12 and 13. Under these conditions, file unit 20 is of the type having carriers 22 provided with retractable retaining lip members 130 of the type described in detail in the mentioned application, Serial No. 296,694. Assume further that conveyor 28 is at rest with a carrier 22, for example, carrier "2" (FIG. 2) positioned at access opening 24. Retaining lip 130 of carrier "2" is maintained at its lower limits by plunger member 140 at the right of access opening 24 (FIGS. 2 and 3). Under such conditions, switch 146 the operation of which, as mentioned, is controlled by cam 144 of retractor bar 137 is unactuated and the said lowered retaining lip 130 of carrier "2" maintains plunger member 141 at the left of access opening 24 (FIGS. 2 and 3) in moved position, whereby switch 142 is also in unactuated condition. Contacts 142A of switch 142 and contacts T1–T3 of switch 146 (FIG. 2) are therefore presently opened in the energizing circuits of the coils U and D (FIG. 12) of the conveyor motor directional control relays. Further, switch 146 is in its unactuated condition as diagrammatically shown in FIG. 13 and maintains contacts T1–T2 closed in the energizing circuit of the coil of relay ER9 in extractor bar motor control circuit. Interlock switch IS is also unactuated, while plunger member 141 is moved by lip 130 whereby contacts IS1 are open and contacts IS2 are closed. In addition, contacts 142A (FIG. 13) in the plunger motor circuit are maintained open by cam 145 on retractor bar 137.

Under the above conditions, further assume that bar assembly 65 is at start position at switch A (FIG. 3) on table 25 with switches B and C unactuated and cam 103 maintaining switch A actuated. Next, assume that the operator desires to bring carrier "3" to posting position at table 25 by driving conveyor 28 in the down direction (FIG. 2) and further desires to bring card tray "*c*" of carrier "3" out on to table 25. Under such conditions, he closes switch KS (FIG. 12) to supply power to bar assembly and conveyor power and control circuits. He then depresses the push button "3" (FIG. 2) corresponding to carrier "3" on keyboard 33. In addition, he depresses push button "*c*" on the card tray keyboard panel 120. Operation of carrier push button "3" closes switch contacts 3*a* (FIG. 12) which are held closed to maintain a circuit to the conveyor commutator assembly COM.

Commutator assembly COM operates in a known manner to prepare an energizing circuit to coil D of the down relay to prepare conveyor 28 for downward movement so that carrier "3" will take the shortest route to posting position in access opening 24. Since, as mentioned, switches 142 and 146 are unactuated, contacts 142A and T1, T3 are open (FIG. 12), whereby the coil of relay D cannot, at this time, be energized. However, an energizing circuit is established for coil PA of the first pulsing relay; the latter circuit extending from line B+ to B*o* through manual switch KS; push button switches 1A, 2A; closed contacts 3A; commutator assembly; rectifier V1; presently closed contacts ER9–4; resistor R1; normally closed contacts D1 and U1 of the down and up directional relays respectively; and normally closed contacts PB1 of the second pulsing relay PB and resistor R2 and timing resistor R3 to coil PA of the first pulsing relay to supply line B*o* and through timing capacitor C2 to supply line B*o*. In addition, a charging circuit is completed for capacitor CA1 which charges to full capacity for purposes to be hereinafter explained. In addition, motor field BMF is energized and the coil of relay ER15 is energized through switch contacts A1–A3, coil of relay ER15, and closed contacts T1–T2 closing contacts ER15–1 in the energizing circuit for the coil of directional relay D without effect.

Relay PA, upon operation, closes its contacts PA1 (FIG. 13) and PA2 (FIG. 12). Contacts PA2 (FIG. 13), upon closing, complete an energizing circuit for coil PB of the second pulsing relay. Relay PB, upon operation, closes its contacts PB2 to establish a self-holding circuit for its coil PB and opens its contacts PB1 interrupting the energizing circuit of coil PA of the first pulsing relay. However, relay PA is maintained energized momentarily through the discharge of capacitor CA2 through timing resistor R3 and its coil PA.

Contacts PA1 (FIG. 13), upon closing, complete an energizing circuit for armature PMA of the plunger motor (shown as 135 in FIG. 2) circuit extending from line L1 to line L2 through normally closed contacts ER12–3 of relay ER12 and presently closed contacts PA4. Motor 130 (FIG. 2), upon rotation, drives retractor bar 137 upward (FIG. 12) whereby switch 143 (FIG. 13) rides off cam 145 on retractor bar 137 closing contacts 143A of switch 143 establishing a second energizing circuit for motor armature PMA (FIG. 13) across supply line L1 to L2. When capacitor CA2 has discharged sufficiently through timing resistor R3 and coil PA, relay PA releases, reopening its contacts PA1 in the circuit of coil PB, but without effect on coil PB, since contacts PB2 are presently closed as previously described. In addition, relay PA, upon release, also opens its contacts PA1 interrupting one of the energizing circuits for motor armature PMA, but without effect. Relay PA, in addition, during operation thereof as described, opens contacts PA4 and closes contacts PA5 in the energizing circuit for the coil of relay ER17 allowing timing capacitor CA4, which was charged upon closing of switch KS, to discharge to energize the coil of relay ER17. Relay ER17, upon operation, closes contacts ER17–1 in the circuit of the coil of relay ER14, but without effect during this period in the cycle of operation since contacts ER12–2 of relay ER12 are open.

Upon the opening of contacts PA1 (FIG. 13) as mentioned, motor armature PMA remains energized through the circuit established from line L1 to L2 established through presently closed contacts 143A of switch 143 and operates through a one-half revolution driving retractor bar 137 to an upper limit position retracting therewith plunger member 140 allowing spring 131 to move retractable lip 130 of carrier "2" to its upper position in front of the card trays 22. As retaining lip 130 restores, plunger plate 141 is released (to the right FIG. 13) to actuate switch 142 to close contacts 142A; and actuating interlock switch IS to open contacts IS2 and close contacts IS1 allowing timing capacitor CA3 (FIG. 12) to charge to full capacity for purposes to be hereinafter explained.

As retractor bar 137 reaches its upper limit position, cam 147 (FIG. 13) thereon engages the arm of switch 144 and opens switch contacts 143A interrupting the circuit to plunger motor armature PMA, which stops. Simultaneously, cam 144 on retractor bar 137 actuates switch 147 closing switch contacts T1–T3, and opening contacts T1–T2 thereof. Relay ER15 thereby releases to close contacts ER15–1 (FIG. 12).

Under these conditions in the cycle of operation as so far described, a circuit (FIG. 12) is now established to the coil of relay D from line B+ to B*o* through carrier switch contacts 1A, 2A; closed contacts 3A; commutator assembly; coil of relay D; closed switch contacts 142A; normally closed contacts ER9–5, ER15–1; presently closed contacts T1–T3. Relay D, upon operation, opens contacts D1 in the pulsing circuit interrupting the circuit to relay PB which releases and closes contacts D2, D3 and D4, energizing the conveyor motor field CMF and operates the conveyor armature CMA for the down direction of conveyor travel. Motor armature CMA rotates driving conveyor 28 in the down direction of travel.

As the selected carrier "3" arrives at posting position, the commutator assembly interrupts the energizing circuit of coil D in a well-known manner interrupting the charging circuit of capacitor CA1 in the pulsing circuit. Control relay D releases its contacts D2, D3 and D4 deenergizing conveyor motor armature CMA which stops. Relay D also upon release recloses contacts D1 in the pulsing circuit of relay PA completing a discharge circuit for capacitor CA1 through resistor R1, contacts D1, U1 and PB1 (all presently closed), R2 and through timing resistor R3 to coil PA and to capacitor C2 to supply line B*o*. Capacitor CA1 is of such selected value sufficient upon discharge thereof to recharge capacitor CA2 and reenergize coil PA. Relay PA, upon reoperation, closes its contacts PA1 (FIG. 13) and PA2 (FIG. 12), pulsing armature PMA of the plunger motor 135 (FIG. 2) sufficient to start to drive retractor bar 137 downward (FIG. 13) whereby cam 144 rides off switch 143 closing contacts 143A (FIG. 13) establishing an alternate energizing circuit for motor armature PMA as coil PA deenergizes to release contacts PA1 through depletion of energy on capacitor CA1 (FIG. 12). Retractor bar 137 (FIG. 13) continues its downward movement until cam 145 engages the arm of switch 143 opening contacts 143A in the circuit to armature PMA. In addition, cam 147 on retractor bar 137 simultaneously disengages the arm of switch 146 opening switch contacts T1–T3 and reclosing contacts T1–T2, preparing an energizing circuit for coil of relay ER9. In addition, retractor bar 137 has driven plunger member 140 to lower retaining lip 130 of carrier "3" stopped at posting position in access opening 24. As lip 130 is thus lowered, it engages plunger member 141 which is moved to deactuate switch 142 which opens contacts 142A in the conveyor control circuit and further deactuates interlock switch IS to open contacts IS1 and close contacts IS2.

Under these conditions, timing capacitor CA3 in the circuit of the coil of relay ER16 (FIG. 12) now discharges through closed contacts IS2 through timing resistor R11 energizing the coil of relay ER16. Relay ER16 closes contacts ER16–1 establishing a circuit from line B+ to line B*o* to the coil of relay ER9 through closed contacts ER16–1, normally closed contacts ER12–1 of relay ER12, coil of relay ER9, presently closed contacts T1–T2. Relay ER9, upon operation, opens its normally closed contacts ER9–5 and ER9–4 in the conveyor motor directional and pulsing circuits respectively, without effect, and further closes its normally open contacts ER9–3, ER9–7 and opens its normally closed contacts 9–6 in the energizing circuit for armature BMA of the bar assembly motor (shown as 85 in FIG. 3). Contacts ER9–3 and ER9–7 (FIG. 12), upon closing, complete an energizing circuit for armature BMA of the bar assembly motor; the latter circuit extending from line B+ to B*o* through normally closed contacts ER10–2 of relay ER10, closed contacts ER9–3, motor armature BMA, closed contacts ER9–7 and normally closed contacts ER10–4. Bar assembly motor 85 (FIG. 3) upon rotation of armature BMA, turns shaft 90 and sprocket wheels 93 and 94 to drive chains 70 and bar assembly 65 toward access opening 24 of file unit 20. As bar assembly 65 is thus driven forward, cam 103 on chain 70 rides off switch A closing contacts A1–A2 (FIG. 12) establishing a second circuit to relay ER9 and interrupting the circuit to relay ER15 which opens contacts ER15–1 without effect. The energy stored on capacitor CA3 dissipates deenergizing the coil of relay ER16 which releases and opens contacts ER16–1 without effect. Bar assembly 65 continues its forward movement until the leading edges of the electromagnets 113 extend over the lowered lip 130 of carrier "3" (FIG. 4). Simultaneously, cam 103 engages and actuates switch B opening switch contacts B1–B2 (FIG. 12) and closing switch contacts B1–B3 thereby applying voltage to the coil of relay ER10 which, upon operation, closes normally open contacts ER10–1 and ER10–3 and opens contacts ER10–2 and ER10–4 in the circuit of armature BMA causing instantaneous reversal of the current through armature BMA, thereby reversing the direction of movement of bar assembly 65. At the same time that switch B is actuated, the coil of relay ER11 is energized from lines B+ to B*o* through presently closed contacts B1–B3, rectifier V11, normally closed contacts ER13–5 of relay ER13. Relay ER11, upon operation, closes its normally open contacts ER11–2 in the energizing circuit for magnetic coils MC. Positive voltage is thereby supplied through normally closed contacts ER13–1, ER13–4 of relay ER13 and through selector card tray switches CT*a*, CT*b*, and closed contacts CT*c* energizing magnetic coil CM*c*. Electromagnet 113 of coil MC*c* couples with the front of card tray "*c*" on carrier "3."

Bar assembly 65 moves away from access opening 24 pulling card tray "*c*" from carrier "3." Relay ER11 also closes its contacts ER11–3 to be self-holding as bar assembly 65 moves away from access opening 24 and cam 103 disengages switch B opening contacts B1–B3 and reclosing contacts B2–B1. However, a circuit is still maintained to the coil of relay ER10 from line B+ to B*o* through closed contacts ER11–1, closed switch contacts C1–C3, presently closed contacts ER10–5. As bar assembly 65 continues its movement toward the front of table 25, cam 103 again engages switch A opening contacts A1–A2, but without effect on the coil of relay ER9, which is maintained energized through presently closed contacts ER11–1 and ER12–1 allowing bar assembly 65 and card tray "*c*" to proceed to posting position at the front of table 25 (FIG. 5). Contacts A1–A3, upon actuation of switch A, reclose momentarily as cam 103 actuates it reenergizing the coil of relay ER15 which momentarily closes contacts ER15–1 without effect. As cam 103 rides off switch A, contacts A1–A2 reclose.

When card tray "*c*" has been withdrawn to its full length on to table 25 by bar assembly 65, dimples 125 on the bottom of card tray "*c*" drop into a channel in the shelf 23 of carrier "3," as seen in FIG. 5, and engage the rear of retracted lip 130 thereof, to prevent disengagement of card tray "*c*" from carrier "3." Simultaneously, switch C is engaged and actuated by cam 103, opening contacts C1–C2 and maintaining switch contacts C1–C3 closed interrupting the circuit to relay ER10 which releases. Simultaneously, a circuit is thereby established to the coil of relay ER12 from line B+ to B*o* through presently closed contacts ER11–1, normally closed contacts ER14–1, and presently closed contacts C1–C3. Relay ER12, upon operation, opens normally closed contacts ER12–1 in the energizing circuit of relay ER9, whereby the coil of relay ER9 deenergizes. Relay ER9, upon releasing, opens its contacts ER9–3, ER9–7 and closes contacts ER9–6 removing armature BMA from a source of power supply and applying dynamic breaking to armature BMA through the closing of contact ER9–6 and resistor R10. Simultaneously, the coil of relay ER13 is energized through closing of normally open contacts ER12–4. The coil of relay ER6 is shunted by a time delay capacitor CA6 which charges to full capacity for purposes to be hereinafter explained. Relay ER13, upon operation, closes contact ER13–3 without effect and opens contacts ER13–2 without effect on relay ER11 which is held through closed contacts B1–B2 and ER11–3. Relay ER13 opens contacts ER13–4 and ER13–1 causing magnetic coil MC*c* to deenergize, whereby tray "*c*" is released. The operator now proceeds to perform his desired work from card tray "*c*."

Next, assume the operator, after performing his work on card tray "*c*" of carrier "3," desires to return card tray "*c*" on to carrier "3" and bring another carrier 21 and card tray 22, for example card tray "*b*" of carrier "2," to posting position at table 25 by driving conveyor 28 in the up direction. Under such conditions, card tray "*c*" of carrier "3" is at reference position on table 25 with cam 103 maintaining switch C actuated in the manner previously described. Under these conditions, next assume, the operator depresses carrier push button "2" closing carrier switch contacts 2A and then depresses card tray push button "*b*" closing contacts CT*b*. The depression of the latter push buttons "2" and "*b*" releases the previously depressed push buttons "3" and "*c*" to unactuated condition as previously stated in a conventional manner. The closing of contact CT*b* prepare an energizing circuit for magnetic coil NC*b* which is presently interrupted by open contacts ER13–4 and ER13–1 (FIG. 12). Since, under these conditions, switch contacts 142A and T1–T3 are also open, operation of the conveyor directional relay U can not be immediately effected. Current is thereby transferred from the commutator assembly COM to the pulsing circuit through rectifier V1 through normally closed contacts ER9–4 of relay ER9, resistor R1, closed contacts D1, U1, PB1, resistors R2, R3, to reenergize the coil of pulsing relay PA and charges capacitors CA1 and CA2 to full capacity in the manner previously described. Relay PA operates to close contacts PA1 in the energizing circuit for plunger motor armature PMA (FIG. 13), but without effect thereon, since the coil of relay PR12 (FIG. 12) is maintained energized through presently closed contacts ER11–1, ER14–1; closed switch contacts C1–C3, whereby contacts ER12–3 in the circuit of armature PMA are maintained open. However, the pulsing of relay PA causes contacts PA4 to open and contacts PA5 both in the energizing circuit for the coil of relay ER17 (FIG. 12), to close. In addition, contacts PA3 in the circuit of relay ER14 open. This allows the energy stored on timing capacitor CA4 to discharge through timing resistor R12 sufficient to energize the coil of relay ER17. The coil of relay PA deenergizes as the energy stored on capacitor CA2 dissipates reclosing contacts PA3 and PA4 and opening PA5 with the coil of relay PB self-holding, as previously described. However, the coil of relay ER17 is sufficiently charged, upon operation, to close contacts ER17–1 preparing an energizing circuit for the coil of relay ER14 through now closed contacts PA3, closed contacts ER17–1, ER12–2, resistors R7, R13 and, in addition, timing capacitor CA5 is charged to full capacity.

As the energy from capacitor CA4 dissipates, the coil of relay ER17 deenergizes opening the energizing circuit of relay ER14 through opening of contacts ER17–1. Capacitor CA5 discharges through resistor R13 maintaining relay ER14 operative sufficient to open contacts ER14–1 to interrupt the circuit for the coil of relay ER12 which deenergizes closing contacts ER12–3 in the circuit of armature PMA (FIG. 13) without effect, since contacts PA1 are now open as coil of relay PA was pulsed only momentarily and has released, as stated, prior to the opening of contacts ER14–1. Contacts ER12–1 are also now closed in the energizing circuit for the coil of relay ER9 whereby the coil of relay ER9 is reenergized. The latter circuit extending from line B+ to B*o* through presently closed contacts ER11–1 and closed contacts ER11-1 and closed contacts ER12–1 through the coil of relay ER2, closed switch contacts T1–T2. An alternate circuit to the coil of relay ER9 is also thereby established through a closed switch contact A1–A2. Relay ER9, upon reoperation, closes contacts ER9–3, ER9–7 and opens contacts ER9–6 in the energizing circuit from bar assembly motor armature BMA, causing armature BMA to be energized to move bar assembly 65 forward from the position shown in FIG. 5, with the bar pushing the retracted card tray "*c*" back toward carrier "3." Cam 103 disengages switch C, opening contacts C1–C3 and closing contacts C1–C2 deenergizing the call of relay ER12. At the same time, relay ER9 is reactivated as contacts ER12–1 close, it recloses contacts ER9–1 in the circuit of the coil of relay ER13. Prior to the reactivation of relay ER9 as relay ER12 releases, ER12 opens contacts ER12–4. The coil of relay ER13 is not deenergized since sufficient energy is stored on timing capacitor CA6 to discharge to maintain the coil of relay ER13 energized for a time sufficient for contacts ER9–1 to close. This insures that magnetic coil MC*b* is not energized, since normally closed contacts ER13–1 and ER13–4 in circuit with magnet coils MC are thereby maintained open during the return movement of bar assembly 65. In addition, contacts ER9–4 open in the circuit of presently operative relay PB which is held operative temporarily through the discharge of capacitor C1 without effect and then releases. As the bar assembly now moves forward, it pushes card tray "*c*" with it, cam 103 engages and actuates A switch contacts without effect on the coil of relay ER9, which is maintained energized through closed contacts ER11–1 and ER12–1. Bar assembly 65 continues forward until tray "*c*" is restored on to carrier "3" behind retaining lip 130. Simultaneously, switch B is actuated by cam 103 opening contacts B1–B2 and closing contacts B1–B3 to energize the coil of relay ER10. Relay ER10 operates to open contacts ER10–2 and ER10–4 and closes contacts ER10–1 and ER10–3 to reverse the direction of current through armature BMA. The actuation of switch B also opens the circuit to the coil of relay ER11 which was self-holding through B switch contacts B1–B2 and contacts ER11–3 making relay ER9 dependent on closed contacts A1–A2 for holding voltage.

Figure 9:
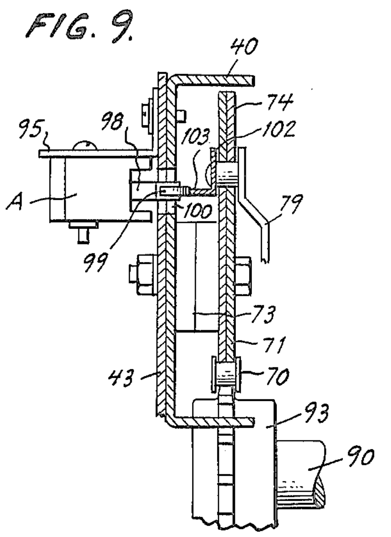
FIG. 9 is a sectional view taken on the line 9—9 of FIG. 3.

Bar assembly 65 now moves away from access opening 24 and cam 103 reengages switch A (FIG. 9). Switch A, upon actuation, opens contacts A1–A2 (FIG. 13) interrupting the circuit to the coil of relay ER9 which opens contacts ER9–3 and ER9–7 to deenergize the armature BMA through dynamic breaking in the manner previously described. Relay ER9 further opens its contacts ER9–1 interrupting the circuit to deenergize the coil of relay ER13, and closes contacts ER9–5 in the conveyor directional circuit and closes contacts ER9–4 in the pulsing circuit of relay PA. Cam 103 maintains switch A actuated, whereby relay ER15 is operated to close contacts ER15–1.

At this point in the cycle of operation, with tray "*c*" restored upon the carrier "3" and bar assembly 65 returned to start position at switch A as mentioned, the said closing of contacts ER9–4 permits pulsing relay PA to be reenergized through closed contacts ER9–4, resistor R1, closed contacts D1, U1, PB1, resistor R3 to recharge capacitor CA2 and maintain coil of pulsing relay PA energized in the manner previously described whereby relay PA closes contacts PA1 in the plunger bar motor circuit (FIG. 13) pulsing armature PMA to drive retractor bar 137 upward, closing switch contacts 143 as previously described to establish a second circuit to armature PMA as relay PA releases and opens contacts PA1. Bar 137 retracts plunger member 140 allowing retractable lip 130 of carrier "3" to restore. In addition, capacitor CA1 is recharged. As retractor bar 137 moves upward, cam 144 on retractor bar 137 actuates switch to interrupt the circuit to armature PMA which stops. In addition, cam 147 on retractor bar 137 reactuates switch opening contacts T1–T2, closing contacts T1–T3. As retractable lip 130 restores, plunger member 141 is released to actuate interlock switch IS which closes contacts IS1 and opens contacts IS2, recharging capacitor CA3. In addition, plunger member 141 actuates switch 142 closing contacts 142A whereby a circuit is established from line B+ to B*o* to operate up directional relay U. Relay U, upon operation, opens contacts U interrupting the circuit to relay PB. Contacts U3 and U4 close in the conveyor motor armature circuit and U2 in the circuit for energizing field CMF. Conveyor motor 30 (FIG. 2) is thereby operated to drive conveyor 28 in an up direction until carrier "2" is in a posting position in access opening 24 at which time the conveyor commutator COM interrupts the circuit to relay U in a conventional manner which open contacts U3 and U4 to stop conveyor motor armature CMA. In addition, contact U1 recloses in the pulsing circuit to allow capacitor CA1 to discharge and reenergize the pulsing relays PA and PB to pulse armature PMA by closing contact PA1 in the manner previously described whereby bar 137 is driven downward to release retaining lip 130 of carrier "2" positioned at tab 25. As retaining lip 130 is lowered, switches 142 and 146 are deactuated in the manner previously described in the down operation and interlock switch IS is released by plunger member 141 to effect operation of relay ER16 through discharge of capacitor CA3 as previously described in the down operation. Relay ER16 again operates to close contacts ER16–1 to energize the coil of relay ER12. Relay ER12, upon operation, permits reenergization of the bar assembly motor armature BMA to move bar assembly toward carrier "2." Cam 103 again engages switch B reversing direction of current through armature BMA which reverses direction of movement of bar assembly. The actuation of switch B energizes relay ER11 in the manner described in the down operation closing contacts ER11–2 to permit magnetic coil CT*b* to be energized and magnetically couples thereto card tray "*b*" of carrier "2." Bar assembly 65 and the coupled card tray "*b*" then proceed to the front of table 25 whereat switch C is again actuated by cam 103 to interrupt the circuit to relay ER12 which opens contacts ER12–1 interrupting the operation of bar assembly motor armature BMA in the manner previously described, with card tray "*b*" in reference position on table 25.

Next, assume under the above conditions, that the operator after performing his work on card tray "*b*" elects to return card tray "*b*" to carrier "2" without selecting another card tray or carrier. Under such conditions, he depresses push button "IN," closing switch contacts "IN" and establishing an energizing circuit for the coil of relay ER14 and charging timing capacitor CA5 to capacity. As the operator releases "IN" button, CA5 discharges a time sufficient to maintain relay ER14 operative to open contacts ER14–1 interrupting the circuit for the coil of relay ER12 which deenergizes. Relay ER12 releases, closing contacts ER12–1 establishing a circuit to the coil of relay ER9 through closed contacts ER11–1 and through closed contacts A1–A2. In addition, contacts ER12–4 open allowing capacitor CA6 to discharge for a time sufficient to maintain the coil of ER13 energized until relay ER9 recloses contacts ER9–1 in the manner previously described to maintain the coil of relay ER13 energized to insure that magnetic coil MC*b* will not be re-energized since contacts ER13–1 and ER13–4 are maintained open.

Relay ER9, upon operation, recloses contacts ER9–3 and ER9–7 and opens contacts ER9–6 in the energizing circuit for motor armature BMA causing bar assembly 65 to move forward. Bar assembly 65 acts now as a pusher bar driving card tray "*b*" back onto carrier "2." The bar assembly motor 85 (FIG. 3) now drives bar assembly 65 in toward the carrier. Since the coil of relay ER11 is still energized through switch contacts B1–B2, switch A is by-passed by cam 103 as the bar moves toward carrier "2." Card tray "*b*" is restored behind retaining lip 130 at which time cam 103 engages switch B to effect energizing the coil of relay ER10 to reverse the current through armature BMA by opening contacts ER10–2 and ER10–4 and closing contacts ER10–1 and ER10–3, in the manner described. In addition, the coil of relay ER10 is deenergized as contacts B1–B2 are opened. Bar assembly 65 proceeds towards its start position at switch A. Since the coil of relay ER11 has been deenergized, the coil of relay ER9 depends upon switch contacts A1–A2 for holding voltage. As cam 103 engages switch A, it opens contacts A1–A2 interrupting the circuit to coil of relay ER9 which deenergizes and applies dynamic breaking to armature BMA in the manner previously described and opens contacts ER9–1 deenergizing the coil of relay ER13 and closes contacts ER9–5 and ER9–4 in the conveyor motor circuit. Switch A is maintained actuated with contacts A1–A3 closed whereby relay ER15 closes contacts ER15–1. The circuitry of FIGS. 12 and 13 is thereby restored to condition preparatory to another cycling of file unit 20.

Next, assume under the above conditions with bar assembly 65, at rest, that the operator desires to extract all the card trays from carrier "2." Under these conditions, he depresses push button "ALL" closing switch contacts AL preparing an energizing circuit for all the magnet coils MC*a* to MC*h*, inclusive. He then depresses push button "OUT" closing switch contacts OT to energize the coil of relay ER16 and charging capacitor CA3 to full capacity and releases "OUT" push button. The coil of relay ER17 remains energized through the discharge of capacitor CA3 sufficient to close contacts ER16–1 to energize the coil of relay ER9 to effect operation of armature BMA as previously described. Bar assembly 65 moves forward with cam 103 releasing switch A to close contacts A1–A2 to establish an alternate circuit to relay ER9 as the coil of relay ER16 deenergizes as previously described. Bar assembly 65 moves forward until cam 103 actuates switch B closing contacts B1–B3 to energize the coil of relay ER11 which closes contacts ER11–2 in the circuit of the magnet coils MC, whereby all coils MC*a* to MC*h*, inclusive, are energized through closed switch contacts AL having a series connection with each magnet coil MC through rectifiers V3 to V10, inclusive. Each energized electromagnet 113 attaches thereto a card tray 22 and as coil relay of ER10 is energized in the previous manner described to reverse motor armature BMA, bar assembly 65 withdraws all of the card trays to posting position whereat switch C is actuated to deenergize the magnet coils through the energizing of the coil of relay ER13 in the manner previously described for a single tray operation. When the operator is finished with his work on the withdrawn trays 22, he may call for another carrier and tray or restore the trays to the carrier by means of "IN" push button, which operates to move bar assembly 65 toward access opening 24 pushing therewith all the card trays 22 back on to carrier "2." Bar assembly 65 is returned to switch A in the manner previously described upon the reactuation of switch B.

Figure 14:
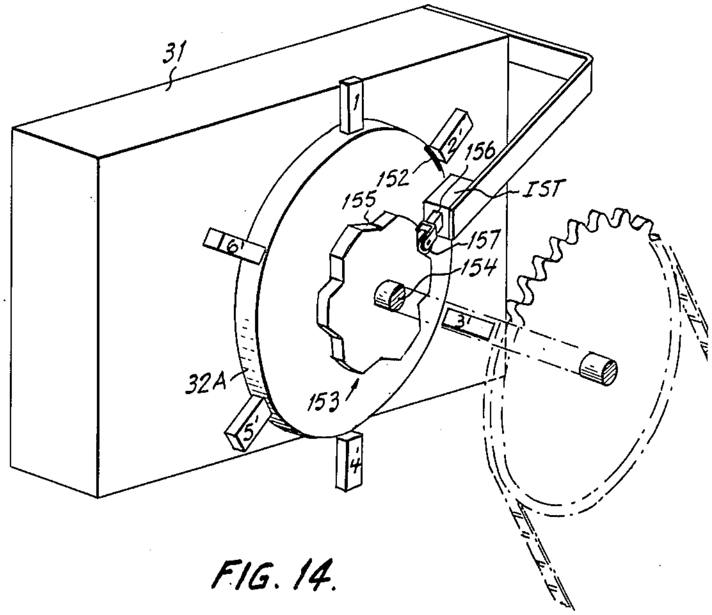
FIG. 14 is a schematic diagram of interlock means for incorporating the operation of the extractor device into a conveyor file device.

Up to this point, two embodiments of the present invention have been disclosed in detail, one is the extractor means employed with a file unit wherein no interrelation is described between the controls of the extractor means and the controls for selectively positioning the desired carrier in the access area, and secondly, the extractor means employed with a file unit which has a retractable tray retaining means. The invention further contemplates utilization of the extractor means with its controls with a file unit wherein interrelation is provided between the controls of the extractor means and the controls of carrier positioning means. Thus, as schematically illustrated in FIG. 14, means are provided for incorporating the bar assembly control means with the conveyor controls of a file unit such as shown in FIG. 2. The conveyor 28 in this third embodiment contemplates a known rotatable commutator 32A for effecting stopping of the conveyor and a selected carrier 21 in position at the work station in access opening 24. A more complete designation of the foregoing is brought out in U.S. Patent 3,105,727 issued October 1, 1963.

As set forth in the mentioned patent it is known to provide a rotatable commutator 32 for stopping the conveyor 28 and a selected carrier 22 in position at the work station in access opening 24. To this end, each carrier selector push button 34 has a brush connection, schematically indicated by reference numerals 1′ to 6′, on the periphery of commutator 32A in FIG. 14. For purposes of illustration only 6 carriers are indicated as mounted on conveyor 28, however, it will be understood that any number of carriers 22 may be mounted on the conveyor. When conveyor 28 is operated, commutator 32A rotates until the brush of the depressed carrier push button 34 engages an insulated segment 152 on commutator 32A to interrupt the circuit to conveyor motor 30 in a well-known manner, whereby motor 30 stops.

As schematically shown in FIG. 14, one arrangement for interlocking the controls of bar assembly 65 to the file unit controls is accomplished by providing a disc 153 secured to a shaft 154 upon which commutator 32A is mounted. Disc 153 rotates with commutator 32A and is provided with a plurality of notches 155 on the periphery thereof. Notches 155 are equal in number to the number of brushes 1′ to 6′ contacting commutator 32A. An interlock switch IST, operable in a manner hereinafter described, is fixedly mounted adjacent disc 153 and is provided with a spring arm 156 and roller 157. Roller 157 rides in notches 155 of disc 153 as disc 153 is rotated with commutator 32A. When a carrier is stopped at access opening 24 by commutator 32A, roller 157 rests in a notch 155 in alignment with a brush 1′ to 6′ maintaining switch IST actuated.

Figure 15:
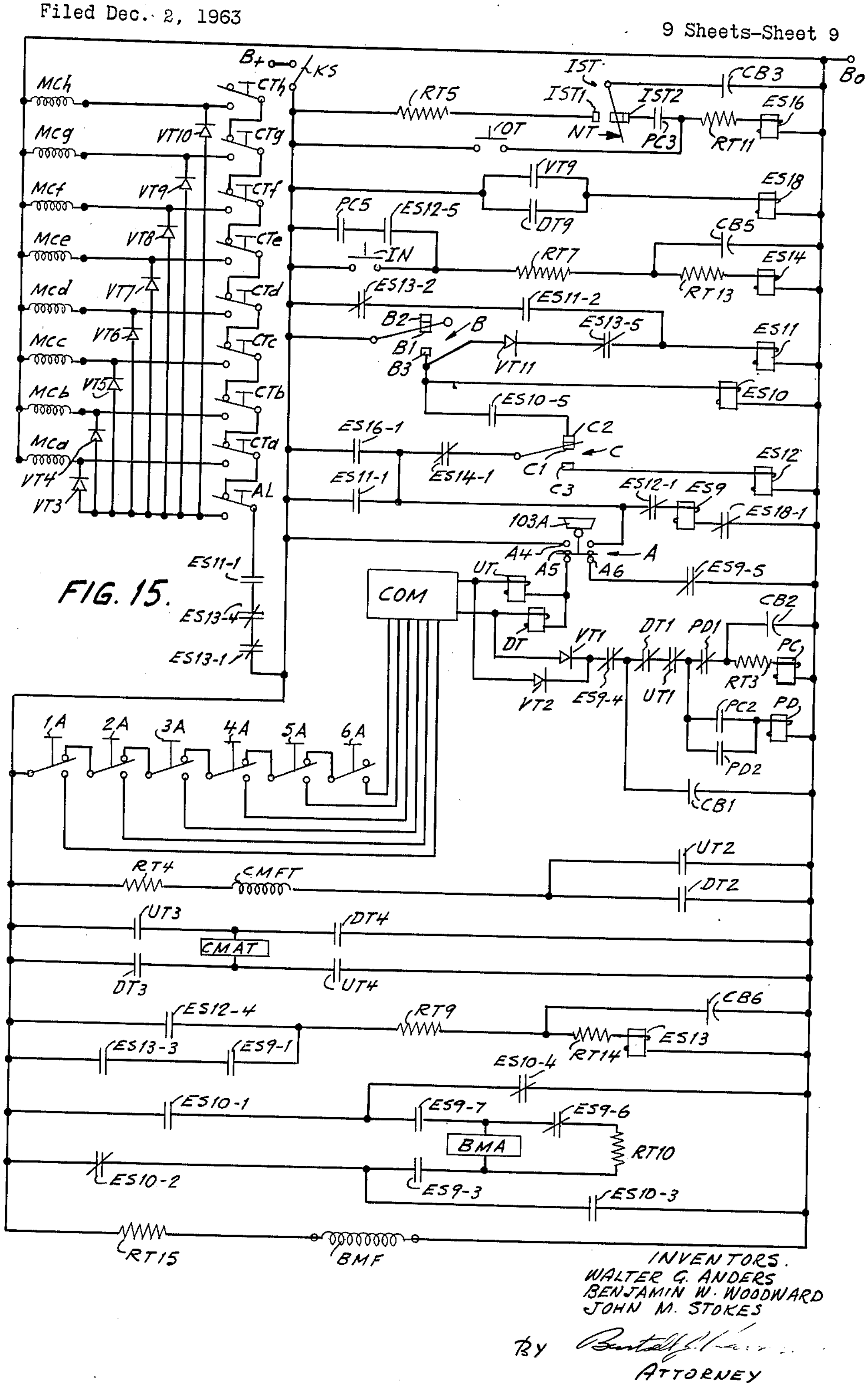
FIG. 15 is a schematic diagram of the power and control circuit for the extractor device employing the interlock means of FIG. 14 as incorporated into the power and control circuit of a conveyor file device in across-the-line form.

Referring now to FIG. 15, a circuit is disclosed for controlling and effecting operation of the extractor means and which means are incorporated into the circuitry of a file unit having a notch disc 153 on a commutator shaft 154 as shown in FIG. 14 and previously discussed. In FIG. 15, unidirectional power is supplied from a conventional source, not shown, over supply B+, Bo to the conveyor power and control circuits and to the extractor means power and control circuits incorporated therewith. CMAT designates the motor armature of the conveyor motor while CMFT designates the motor field winding thereof. BMA designates the armature of bar assembly motor 85 (FIG. 3) and AMF the motor field winding thereof. Switch contacts of carrier push buttons 34 are designated 1A to 6A inclusive, and are shown connected in series. It will be understood however that any number of push button contacts may be connected in series depending upon the number of carriers 22 on conveyor 28. For purposes of simplicity, only six sets of contacts are shown to represent a conveyor having six carriers.

Electromagnetic relays used in the control of the conveyor motor power and control circuit are designated as follows: UT—up directional relay, DT—down directional relay, PC—first pulsing relay, and PD—second pulsing relay. These identifying letters are applied to the coils (FIG. 15) of the relays with suffix numerals appended thereto applied to the contacts of the relays. The electromagnetic relays of the bar assembly power and control circuit are designated ES with numeral suffixes being appended thereto to distinguish one relay from the other and with hyphenated suffix numerals appended thereto applied to the contacts of relays ES to differentiate between different sets of contacts on the same relay. All relay contacts being shown for the unoperated condition of their relays. Commutator 32A is shown as a box designated COM.

Resistors are generally designated RT, capacitors CB and rectifiers VT with numeral suffixes being appended thereto to distinguish similar circuit components one from the other. KS designates manual knife switch contacts connected in supply line B for disconnecting and connecting the conveyor and bar assembly power and control circuitry from the power supply (not shown). Coils 110 of electromagnets 113 are designated MC*a* to MC*h*, inclusive, with the contacts of their corresponding card tray push butons 121 (FIG. 2) designated CT*a* to CT*h*, inclusive. AL designates ALL switch contacts; IST1 and IST2 designate the contacts of interlock switch IST; and A4, A5, A6; B1, B2, B3; and C1, C2, C3 the contacts of bar assembly switches A, B and C, respectively. Contacts A5, B1 and C1 of said switches being movable and the remainder stationary. Cam 103 of bar assembly 65 is schematically designated as 103*a*, and notches 155 on disc 153 (FIG. 14) on commutator shaft 154 are designated by an arrow and letters NT. Contacts A5–A6 are shown as actuated and closed and contacts IST2 are shown as actuated and closed. OT and IN designate the contacts of "OUT" and "IN" push buttons respectively.

Connected across the coils of relays ES16, ES14, ES13, and pulsing relay PC are RT timing circuits consisting of timing resistors and timing capacitors as shown. The value of the timing resistors and capacitors are selected so as to delay the release of their respective relays for a predetermined time measured from the removal of applied power to the relay energizing coil for purposes to be explained hereinafter.

Assume that it is desired to use extractor means including bar assembly 65 and supporting table 25 as previously described as a unit to operate automatically with the operation of conveyor 28 (not having retractable tray retaining means) through the circuitry shown in FIG. 15. Assume further that conveyor 28 is at rest with a carrier 22, for example, carrier "2" positioned at access opening 24 as seen in FIG. 2. Under such conditions, bar assembly 65 is at its start position wherein switch A is actuated (FIG. 3) with switches B and C in unactuated condition and with switch A held actuated by cam 103. Further, switch arm 156 of interlock switch IST (FIG. 14) is positioned within notch 155 on disc 153 in alignment with brush 2′ of carrier push button 2 whereby contacts IST1 are open and contacts IST2 are closed as previously stated.

Next, assume that the operator desires to bring carrier "4" to posting position at table 25 by driving conveyor 28 in the down direction and further desires to bring card tray "*a*" of carrier "4" out on to table 25. Under such conditions, he closes switch KS (FIG. 15) to supply power to the bar assembly and conveyor power and control circuits of FIG. 15. He then depresses carrier self locking push button "4" on keyboard 33 and, in addition, depresses self locking push button "*a*" on card tray keyboard panel 120. Operation of carrier push button "4" closes contacts 4A (FIG. 15) which are held closed to maintain a circuit through the commutator assembly COM (FIG. 15) to prepare an energizing circuit for coil DT of the down conveyor directional relay. Since contacts ES9–4 of relay ES9 and contacts A5–A6 of switch A in the energizing circuit of directional relay DT are closed, the coil of relay DT is energized and relay DT operates to close contacts DT3, DT4 and DT2 to energize coil CMFT and conveyor motor armature CMAT to move conveyor 29 (FIG. 2) in the down direction to access opening 24.

It is to be noted that pulsing relay PC is momentarily pulsed through rectifier VT1, normally closed contacts ES9–4, normally closed contacts DT, UT1, PD1 but without effect, since relay DT immediately opens contacts DT1 upon energization of its coil to interrupt energization of relay PC. Relay DT further closes contacts DT9 in the energizing circuit of relay ES18, which operates to open contacts ES18–1 in the circuit of the coil of relay ES9 to insure that bar assembly armature BMA is not energized during conveyor movement.

In addition capacitor CB1 in the pulsing circuit is charged to full capacity through rectifier VT1 and normally closed contacts ES9–4.

As conveyor 28 is driven downward roller 157 of arm 156 of interlock switch IST rides out of the notch 155 on disc 153 (FIG. 14) closing contacts IST 1 (FIG. 15) and opening contacts IST2, allowing capacitor CA3 to charge full capacity through resistor R5. Interlock switch IST opens and closes during the rotation of disc 153 (FIG. 14) but without effect to discharge capacitor CB3 (FIG. 15) through the coil of relay ES16, since contacts PC3 of relay PC are normally open. When carrier "4" is positioned at access opening 24, commutator assembly interrupts the circuit to the coil of relay DT in a well-known manner which deenergizes the coil of relay D opening contacts DT3, DT4 and DT2 in the circuit of armature CMAT, which stops conveyor motor 30. In addition contacts DT9 open to deenergize the coil of relay ES18. At the same time, interlock switch arm 156 of switch IST (FIG. 14) drops into the notch 155 (shown as arrow NT in FIG. 15) of disc 153 in alignment with brush 4′ reclosing contacts IST2. Simultaneously, upon the closing of contacts DT1 in the pulsing circuit capacitor CB1 discharges through contacts DT1, UT1, PD1 to energize the coil of relay PC which closes contacts PC3 in the energizing circuit of the coil of relay ES16, allowing timing capacitor CA3 to discharge. As relay PC is then energized, it also closes contacts PC5 without effect; and closes contacts PC2 whereby PD is energized to close contacts PD2, relay PD and opens contacts PD1 interrupting the circuit to relay PC, which is held energized by the discharge of capacitor CB2 a time sufficient for capacitor CB3 in the circuit of relay ES16 to energize the coil of relay ES16 through timing resistor RT11 and then releases. Relay ES16, upon operation, closes contacts ES16–1 establishing an energizing circuit from lines B+ to Bo for the coil of relay ES9 through presently closed contacts ES16–1 and normally closed contacts ES12–1 through the coil of relay 12, and normally closed contacts ES18–1. Relay ES9, upon operation, closes normally open contacts ES9–7 and ES9–3 in the circuit of bar motor armature BMA, whereby motor 85 (FIG. 3)

is operated to drive bar assembly 65 forward toward access opening 24 (FIG. 3) and cam 103 rides off switch A to close contacts A4–A5, and opens contacts A5–A–6. The coil of relay ES16 having deenergized opens contacts ES16–1 with the coil of relay ES9 maintained energized through closed switch contacts A4–A5. In addition, relay ER9 opens contacts ES9–4 interrupting the circuit to relay PD. The coil of relay PD is held operative temporarily when contacts ES9–4 open through the discharge of capacitor CB1 without effect and deenergizes as the energy on capacitor CB1 dissipates. Bar assembly 65 continues forward until cam 103 engages switch B to open contacts B1–B2 and closes contacts B2–B3 preparing and energizing circuit for the coil of relay ES11–1, which closes contacts ES11–1 to establish an energizing circuit to the coil MC*a* through normally closed contacts ES13–1 and ES13–4; presently closed contacts ES11–1, AL contacts, closed switch contacts CT*a* to the coil MC*a*. Coil MC*a*, upon energizing, energizes magnet 113 having coil MC*a*, and which electromagnet 113 in alignment with card tray "*a*" on carrier "4" and magnetically couples with the front thereof. In addition, the coil of relay ES10 is energized as switch B is actuated to reverse the direction of current through bar motor armature BMA when relay ES10 opens contacts ES10–2 and ES10–4 and closes contacts ES10–1 and ES10–3 to drive bar assembly 65 and tray "*a*" away from access opening 24, to posting position. The coils of relays ES10 and ES11 become self-holding through the closing of normally open contacts ES10–5 and ES11–2, respectively, as cam 103 releases switch B. Cam 103 again actuates switch A as bar assembly 65 moves to the front of table 25 without interrupting the circuit to relay ES9 since contacts ES11–1 are presently closed and switch A is thereby bypassed. Cam 103 then engages switch C, opening contacts C1–C2 to deenergize the coil of relay ES10 which releases. Contacts C1–C3 close energizing the coil of relay ES12 which opens contacts ES12–1 to interrupt the operation of relay ES9 whereby armature BMA is stopped through the opening of contacts ES9–3 and ES9–7 and through dynamic breaking effected through resistor R10 and opening of contact ES9–6. Contacts ES9–4 and ES9–5 close without effect. Contacts ES9–1 close whereby the coil of relay ES13 is energized and which relay ES13 opens contacts ES13–4 and ES13–1 to denergize magnet coil MC*a* and opens contacts ES13–2 without effect. In addition, timing capacitor CB6 is charged to capacity for purposes to be explained. Tray "*a*" of carrier "4" is now stopped at posting position on table 25.

Assume that after the operator is finished with his work on card tray "*a*," he desires to restore card tray "*a*" to carrier "4" and operate conveyor 28 to drive conveyor in an up direction to position carrier "3" at access opening 24 and withdraw card tray "*d*." Under these conditions, he depresses carrier push button "3" restoring push button "4" to release position in a conventional manner as previously stated and depresses card tray selector push button "*d*" releasing push button "*a*." A circuit is established to commutator COM through switch contacts 1A, 2A, and closed switch contact 3A but since, under these conditions, switch A is unactuated, and contacts A5–A6 are open, the coil of up directional relay UT can not be energized at this point in the cycle of operation. Pulsing relay PC is energized and capacitor CB2 charged through rectifier VT2, presently closed contacts ES9–4, normally closed contacts DT1, UT1, PD1. The coil of relay PC is temporarily pulsed in the manner previously described. Relay PC upon operation closes contacts PC3 without effect. Contacts PC5, however, upon closing establish an energizing circuit to the coil of relay ES14 through presently closed contacts ES12–5, resistor RT7 and timing resistor RT13 and to energize the coil of relay ES14 and charge capacitor CB5 to capacity. Relay ES14 operates to open contacts ES14–1 to interrupt the circuit to the coil of relay 5, which releases to close contacts ES12–1 to establish an energizing circuit to the coil of relay ES9. Since relay PC is operative only momentarily upon discharge of capacitor CB2 and releases contacts PC5 to normally open condition whereby timing capacitor CB5 discharges to maintain relay ES14 operative for a time sufficient for relay ES9 to operate. In addition, capacitor CB6 discharges for a time sufficient to maintain relay ES13 operative as contacts ES12–4 reopen until the coil of relay ES9 reenergizes to close contacts ES9–1 to maintain relay ES13 operative to prevent energizing magnet coil MC*d* at this time. Relay ES9 closes contacts ES9–7 and ES9–3 and opens ES9–6 to establish a circuit to the armature BMA, which drives bar assembly 65 forward from switch C (FIG. 5). Relay ES9 (FIG. 14) in addition, opens contacts ES9–5 in the conveyor circuit and contacts ES9–4 in the pulsing circuit interrupting a circuit to the coil of PB. Upon opening of contacts ES9–4, capacitor CB1 discharges to maintain temporarily relay PD operative without effect, and then dissipates and relay PD releases.

Bar assembly 65 (FIG. 5) moves forward pushing card tray "*a*" with it to access opening 24. Cam 103 actuates and deactuates switch A without effect on the coil of relay ES9 which is maintained operative through presently closed contacts ES11–1. As bar assembly 65 pushes tray back on to carrier "4," cam 103 actuates switch B interrupting the operation of relay ES11 which releases. Relay ES10 is reoperated in the manner previously described to reverse the direction of movement of bar assembly 65, which now moves back to start position at switch A. The coils of relay ES9 and ES10 are dependent at this point on closed contacts A4–A5 for holding voltage. As cam 103 reengages switch A, these latter circuits are interrupted and the armature BMA is stopped through dynamic breaking of armature BMA as previously described with bar assembly 65 at start position. In addition, contacts A5–A6 close and are maintained closed by cam 103 and relay ES13 is deactuated as contacts ES9–1 open in the circuit of its energizing coil.

As relay ES9 releases, it closes contacts ES9–5 allowing the coil of up directional relay UT to now energize through a circuit from Line B+ to B*o* through push button switch contacts 1A, 2A closed contacts 3A, commutator COM, closed contacts A5–A6 and ER9–5. Relay UT closes contacts UT3, UT4 and UT2 to energize armature CMAT to move conveyor 28 in the up direction. In addition, contacts ES9–4 close to recharge capacitor CB1. Normally closed contacts UT1 open, without effect, contacts UT9 close allowing the coil of relay ES18 to reenergize and open contacts ES18–1. As commutator 32A is rotated as conveyor 28 is driven upward (clockwise FIG. 2) arm 157 (FIG. 14) of interlock switch IST rides out of notch 155 to close contacts IST1 to recharge capacitor CB3. The operation of relay UT is interrupted by the commutator COM when carrier "3" reaches the work station, whereby contacts UT3, UT4 and UT2 open to interrupt the circuit to armature CMFT stopping conveyor motor 30 as previously described. Arm 156 of switch IST drops into a notch 155 on disc 153 (FIG. 14) in alignment with brush 3′ closing contacts IST2 preparing capacitor CB3 for discharge. Simultaneously, contact UT1 closes and the coil of relay PC is pulsed through the discharge of capacitor CB1 in the manner described for the down operation to close contacts PC3 allowing capacitor CB3 to discharge and energize the coil of relay ES16, which closes contacts ES16–1 to drive bar assembly 65 forward as the coil of relay ES9 is reenergized in the manner described for the down operation. Bar assembly 65 continues forward until cam 103 actuates switch B (FIG. 3) whereby the coil of relay ES11 is energized to close contacts ES11–1 to allow coil MC*d* to energize through closed contacts ES13–1; ES13–4 and ES11–1. The electromagnet 113 of coil MC*d* couples thereto tray "*d*" of carrier "3" and withdraws it to posting position (FIG. 5) as the direction of travel of bar assembly 65 is reversed by switch B and then stopped at switch C in the manner described.

Assume, under these conditions, that with tray "*d*" of carrier "3" at posting position, the operator desires to restore the same to carrier "3" without calling for another tray 22. Under these conditions, he depresses "IN" push button (FIG. 2) to close switch contacts IN (FIG. 15) energizing the coil of relay ES14 and charging capacitor CB5. Relay ES14 is held operative as the operator releases push button "IN" for a time sufficient to open contacts ES14–1 and interrupt the circuit to the coil of relay ES12 as previously described to permit the coil of relay ES9 to be energized to move bar assembly 65 back toward carrier "3" pushing with it card tray "*d*" which is restored to carrier "3" as described with respect to tray "*a*" of carrier "4." However, when bar assembly 65 now returns to switch A from carrier "3" and cam 103 reactuates switch A, the conveyor is not reoperated since no new carrier push button has been depressed to reactivate commutator COM. The circuitry is therefore restored to condition preparatory to another cycling of the unit.

Assume that under these conditions, the operator wishes to retract all the card trays from carrier "3." Under such conditions, he depresses card tray push button "ALL" closing contacts "AL" and thereby releasing previously depressed card tray button "*d*" preparing a circuit to energize all the magnet coils MC*a* through MC*h* inclusive, through rectifiers VT3 to VT10 connected in series. He then depresses "OUT" push button closing contacts OT which establish an energizing circuit for the coil of relay ES16 which closes contacts ES16–1 to effect operation of relay ES12 in the manner previously described to drive bar assembly toward access opening 24 in the manner previously discussed. The operator releases "OUT" push button allowing the circuit ES16 to be interrupted without effect, since relay ES9 is maintained operative by closed contacts A4–A5 which close as cam 103 disengages switch A. When bar assembly reaches carrier "3," cam 103 actuates switch B allowing the coil of relay ES11 to energize the closed contacts ES11–1 whereby all the coils MC are energized through series connectors through closed contacts AL and each magnetically couples thereto an aligned card tray "*a*" to "*h*" inclusive withdrawing all the said card trays "*a*" to "*h*" from carrier "3," as the direction of travel of bar assembly 65 is reversed by relay ES10 in the manner described in the up and down operations. When all the card trays reach posting position on table 25, cam 103 engages switch C to stop motor 85 in the manner described. When the operator is finished with work on the withdrawn card trays 22, he may then restore all of the card trays to carrier "3" and return bar assembly 65 to start position without calling for another carrier by operation of "IN" push button as described, or he may return the trays and select a new carrier and tray or trays by use of the carrier and card tray push buttons in the manner described as described for the up and down operations.

It will be readily understood by those skilled in the art that the switch contacts CT*a* to CT*h* inclusive of card tray selector push buttons 121 and contacts AL of "ALL" push button need not be connected in series whereby one or all coils MC*a* to MC*h* are energized in the manner described. It will be readily apparent that magnet coils MC*a* to MC*h* may have individual connections with their respective push buttons 121, in addition to a series connection with the 'ALL" push button, whereby more than one or all card trays may be withdrawn at a given time. It also will be readily apparent that carrier selection keyboard 33 and card tray keyboard 120 may be arranged as one keyboard at a convenient position on table 25 or on file unit 20 if desired with appropriate index labels or strips (not shown) provided adjacent the combined keyboard to readily index the contents of a particular carrier 21 and a card tray 22 disposed thereon. It is also to be noted that, as will be apparent, that the term sensing means as used in the claims includes the various means in the several embodiments disclosed and described which complete the circuit to a coil or coils MC of electromagnets 113 during operation of assembly 65 for which a selection has been made and registered through operation of either individual card tray push buttons 121 or push button ALL.

It will be apparent that the novel extractor means as described has many advantages in use. Among other advantages, the extractor means may be used as a separate unit or readily incorporated into a file unit as described in detail, whereby the extractor means operate automatically through operation of the conveyor control means. This advantage allows the described device to be adapted to many different type file units. The fact that the containers are withdrawn and restored automatically from the shelf reduces operator fatigue and results in greater efficiency in the operation and use of mechanized type file units.

It is further to be expressly understood that the invention is not limited to the embodiments illustrated and described in detail. Various changes can be made in the design and arrangement of parts without departing from the spirit and scope of the invention as the same will now be understood by those skilled in the art.

What is claimed is:

1. In conveyor driven equipment, (a) a conveyor, (b) a plurality of article carriers carried by said conveyor, (c) said article carriers being spaced along said conveyor for conveyance along a predetermined path of travel sequentially past a certain work station at a point along said path of travel, (d) each of said article carriers being adapted to hold a predetermined plurality of articles in certain positions with respect to each other on a said carrier, (e) a portion of each article formed of magnetizable material, (f) a plurality of individual magnet means operative selectively for establishing individual magnetic attractive forces, (g) said magnet means being positioned at said work station and one each of which said force establishing means is provided for each of said article holding positions, (h) motive means for said conveyor, (i) start and stop initiating means for said conveyor motive means for controlling operation of said conveyor, (j) first means for selecting any one of said force establishing means for operation and for registering said selection, (k) second means for registering a command for a desired one of said article carriers to be moved by said conveyor to said work station, (l) said start and stop initiating means being responsive to such command registration for causing said conveyor motive means to drive said conveyor to bring said desired article carrier to said work station, (m) means operative incident to the arrival of said desired carrier at said work station for rendering said individual force establishing means responsive to said first selecting and registering means causing operation of the selected one of said individual force establishing means causing magnetic coupling therewith of the article in its associated article holding position on the carrier sensed as being at said work station, and (n) means for causing relative movement between said individual magnet means and said article carrier causing separation of said coupled article from the remaining uncoupled ones of said articles on the selected carrier.

2. In conveyor driven equipment, (a) a conveyor movable in a predetermined path of travel, (b) an article work station at a point disposed along said path of travel,
(c) a plurality of carriers connected for movement with said conveyor to said station,
(d) article carrying containers disposed on said carriers in predetermined positions,
(e) conveyor control means operable for controlling operation of said conveyor and effecting the stopping and starting of said conveyor and said carriers and for positioning a selected carrier at said work station,
(f) extractor means operable to withdraw a selected container from said selected carrier,
(g) said extractor means including a bar assembly arranged adjacent said work station,
(h) a plurality of electromagnets mounted on said bar assembly for each of said predetermined positions of a carrier,
(i) means mounting said bar assembly for movement toward and away from said selected carrier,
(j) motor means to effect said movement of said bar assembly,
(k) means for selecting and registering any one of said electromagnets for operation and registering such selection,
(l) means operable in response to operation of said conveyor control means upon positioning of said selected carrier at said work station to effect operation of said motor means to move said bar assembly to said carrier, and
(m) sensing means responsive to said selecting and registering means during movement of said bar assembly to activate a selected electromagnet to couple said selected container thereto and withdraw said selected container from its said predetermined position on said carrier.

3. In a file unit of the class described,
(a) a housing having an access opening provided in one side thereof,
(b) a conveyor in said housing,
(c) a plurality of carriers connected to said conveyor,
(d) a plurality of article carrying containers disposed on said carriers in predetermined positions,
(e) conveyor control means operable for controlling operation of said conveyor and effecting the stopping and starting of said conveyor and said carriers for positioning a selected carrier at said access opening,
(f) table means provided at said access opening,
(g) a bar assembly arranged on said table means and extending across the width of said access opening,
(h) a plurality of magnet means carried by said bar assembly for each of said predetermined positions of a carrier,
(i) means for selecting and registering any one of said magnet means for operation and registering such selections,
(j) means mounting said bar assembly for movement toward and away from said access opening,
(k) said mounting means including motor means to effect said movement of said bar assembly, and
(l) bar assembly control means operable in response to operation of said conveyor control means upon positioning of said selected carrier at said access opening to effect operation of said motor means to move said bar assembly to said carrier, and
(m) sensing means responsive to said selecting and registering means during operation of said bar assembly control means to energize a selected electromagnet means to couple a selected container thereto and withdraw said selected container from said carrier.

4. The file unit of claim 3 wherein said bar assembly control means includes switch means in circuit with said motor means for controlling operation thereof and said combination further including cam means carried by said mounting means controlling operation of said switch means during movement of said bar assembly.

5. The file unit of claim 3 wherein said mounting means includes chain means arranged on said table means at opposite ends of said bar assembly, brackets connecting said bar assembly to said chain means at opposite ends of said bar assembly, guide means for said chain means, and sprocket wheel drive means interconnecting said chain means to said motor means to drive said chain means to move said bar assembly toward and away from said access opening upon operation of said motor means.

6. In a file unit of the class described,
(a) a housing having an access opening provided in one side thereof,
(b) a conveyor in said housing,
(c) a plurality of carriers connected to said conveyor,
(d) a plurality of article containers disposed on said carriers in predetermined positions,
(e) conveyor control means operable for controlling operation of said conveyor and effecting the stopping and starting of said conveyor and said carriers for positioning a selected carrier at said access opening,
(f) table means provided at said access opening,
(g) a bar assembly arranged on said table means and extending across the width of said access opening,
(h) a plurality of electromagnets mounted on said bar assembly for each of said predetermined positions,
(i) means mounting said bar assembly for movement toward and away from said access opening,
(j) motor means to effect movement of said mounting means and bar assembly,
(k) bar assembly control means operable in response to operation of said conveyor control means upon positioning of said selected carrier at said access opening to effect operation of said motor means to move said bar assembly to said carrier,
(l) means for selecting and registering any one of said electromagnets for operation and registering said selection,
(m) sensing means operable in response to said selecting and registering means upon movement of said bar assembly to said access opening to energize a selected electromagnet for one of said predetermined positions to couple a selected article container of said selected carrier in said one predetermined position thereto,
(n) said bar assembly control means having first switch means actuatable to reverse said motor means and move said bar assembly and attached container away from said access opening and second switch means actuatable to stop said motor and deenergize said electromagnet when said container is withdrawn a desired distance out of said access opening, and
(o) actuating means carried by said mounting means to control actuation of said first and second switch means.

7. The file unit of claim 6 wherein said bar assembly control means is operable to effect operation of said motor means to drive said bar assembly and said withdrawn container toward said access opening to restore said container to said one predetermined position on said carrier.

8. In a file unit of the class described,
(a) a housing having an access opening provided in one side thereof,
(b) a conveyor in said housing,
(c) a plurality of carriers connected to said conveyor,
(d) a plurality of article carrying containers disposed on said carriers in predetermined positions,
(e) conveyor control means including circuit means operable for controlling operation of said conveyor and effecting the stopping and starting of said conveyor and said carriers for positioning a selected carrier at said access opening,
(f) table means provided at said access opening,
(g) a bar assembly arranged on said table means and extending across the width of said access opening, (h) a plurality of electromagnets mounted on said bar assembly for each of said predetermined positions,
(i) means for selecting and registering any one of said electromagnets for operation and registering such selection,
(j) means mounting said bar assembly for movement toward and away from said access opening,
(k) motor means to effect movement of said bar assembly,
(l) bar assembly control means including circuit means to effect operation of said motor means,
(m) interlock means provided between said bar assembly circuit means and said conveyor control circuit means to prevent operation of said bar assembly control means during operation of said conveyor,
(n) means provided to actuate said interlock means upon positioning of said selected carrier at said access opening and stopping of said conveyor,
(o) pulsing means to effect operation of said bar assembly control means upon actuation of said interlock means to effect operation of said motor means to move said bar assembly toward said access opening, and
(p) sensing means responsive to said selecting and registering means during movement of said bar assembly to effect energization of a selected electromagnet to couple a selected container of said selected carrier thereto to withdraw said container onto said table means when said bar assembly control means are operated to move said bar assembly away from said access opening.

9. The file unit of claim 8 wherein said conveyor control means include a rotatable commutator, said interlock means including a mechanical switch and said interlock actuating means including a notched disc mounted for rotation with said commutator to actuate said mechanical switch upon stopping of said conveyor and selected carrier at said access opening.

10. In a file unit of the class described,
(a) a housing having an access opening provided in one side thereof,
(b) a conveyor in said housing,
(c) a plurality of carriers connected to said conveyor,
(d) a plurality of article carrying containers disposed on said carriers in predetermined positions,
(e) container retaining means for each of said carriers being selectively operable to retaining and releasing conditions, said retaining means in retaining condition obstructing movement of said containers from said carriers and in releasing condition removing said obstruction,
(f) a work station provided adjacent said access opening,
(g) conveyor control means operable for controlling operation of said conveyor and effecting the stopping and starting of said conveyor and said carriers for positioning a selected carrier at said work station,
(h) plunger means operable in response to said control means for operating said retaining means of a selected carrier positioned at said work station to releasing condition,
(i) container extractor means provided at said access opening and including a plurality of electromagnets for said predetermined positions of a carrier,
(j) means for selecting and registering any one of said electromagnets for operation and registering such selection,
(k) means mounting said extractor means for movement toward and away from said access opening,
(l) extractor means control means operable in response to operation of said conveyor control means and the operation of said plunger means releasing the retaining means of a selected carrier positioned at said access opening to effect movement of said extractor means toward said access opening, and
(m) sensing means responsive to said selecting and registering means during movement of said bar assembly to activate a selected electromagnet to couple a selected container thereto and withdraw said selected container from its predetermined position on said carrier.

11. An extractor device for use in conjunction with a support member wherein articles each having a portion formed of magnetizable material are positioned thereon in predetermined sorting positions, said extractor device comprising
(a) an assembly for carrying magnet means,
(b) means mounting said assembly for movement between spaced limit positions,
(c) a plurality of magnet means carried by said assembly and selectively operable for establishing individual magnetic attractive forces,
(d) means for driving said assembly to a first of said limit positions whereat said magnet means are brought into predetermined article coupling position each with an article sorting position of the support member,
(e) means for selecting any one of said magnet means for operation and for registering such selection prior to movement of said assembly,
(f) sensing means operable during movement of said assembly to said first limit position to effect operation of the selected magnet means for which a selection has been registered by said selecting and said registering means,
(g) said selected operated magnet means operable to couple thereto an article in the article sorting position associated with said operated magnet means upon arrival of said assembly at said first limit position, and
(h) said drive means further operable upon said coupling to move said assembly and coupled article away from the support member to the other of said spaced limit positions.

12. An extractor device for use in conjunction with a supporting shelf wherein article carrying containers each having a portion formed of magnetizable material are positioned thereon in predetermined side-by-side sorting positions, said extractor device comprising,
(a) a frame member,
(b) an assembly for carrying electromagnets arranged on said frame member,
(c) means mounting said assembly for movement between spaced limit positions on said frame member,
(d) a plurality of electromagnets carried by said assembly and arranged in predetermined spaced relationship on said assembly each in alignment with an article carrying container on the supporting shelf,
(e) motor means operable to drive said assembly to a first of said limit positions whereat said electromagnets are brought into coupling position each with an aligned article carrying container on the supporting shelf,
(f) means for selecting any one of said electromagnets for operation and for registering such selection prior to said movement of said assembly,
(g) sensing means operable during movement of said assembly to said first limit position to effect operation of the selected electromagnet means for which a selection has been registered by said selecting and said registering means,
(h) said selected operated electromagnet coupling thereto the article carrying container on the shelf in alignment therewith, and
(i) control means operable to control operation of said motor means and operable upon said coupling to move said assembly and coupled container away from the supporting shelf to the other of said spaced limit positions on the frame member.

13. An extractor device for use in conjunction with a support member wherein articles are positioned thereon in predetermined sorting positions, said extractor device comprising, (a) an assembly for carrying article coupling means,
(b) means mounting said assembly for movement between spaced limit positions,
(c) a plurality of article coupling means carried by said assembly,
(d) means for driving said assembly to a first of said limit positions whereat said article coupling means are brought into predetermined article coupling position each with an article sorting position on the support member,
(e) means for selecting any one of said coupling means for operation and for registering such selection prior to movement of said assembly,
(f) sensing means operable during movement of said assembly to said first limit position to prepare for operation the selected coupling means for which a selection has been registered by said selecting and registering means,
(g) said selected prepared coupling means operable to couple thereto an article in the article sorting position associated therewith upon arrival of said assembly at said first limit position, and
(h) said drive means further operable upon said coupling to move said assembly and coupled article away from the support to the other of said spaced limit positions.

14. The combination of claim 12 wherein said sensing means is operable to effect energization of all of said plurality of electromagnets in response to said selecting and registering means whereby all of said containers are coupled to and withdrawn from said shelf by said assembly.

15. The combination of claim 12 wherein said control means are further operable to effect operation of said motor means to drive said assembly and container toward said carrier to restore said container to said carrier.

16. The combination of claim 12 wherein said mounting means include spaced chains arranged at each end of said assembly and further include spaced brackets each having portions secured to a said chain and second portions secured to said bar assembly.

17. In a file unit of the class described, (a) a housing having an access opening provided in one side thereof, (b) a conveyor in said housing and movable in a predetermined endless orbital path of travel,
(c) a plurality of carriers connected for movement with said conveyor to and past said access opening,
(d) each of said carriers having a horizontal shelf portion,
(e) a plurality of article carrying containers disposed in predetermined side-by-side position on each of said shelf portions,
(f) conveyor control means operable for controlling operation of said conveyor and effecting the starting and stopping of said conveyor and said carriers for positioning a selected carrier adjacent said access opening,
(g) displacing means operable to displace a selected one of the plurality of article carrying containers on the selected carrier outwardly of said housing through said access opening,
(h) said displacing means including an assembly mounting article coupling means adapted for coupling engagement with said container,
(i) means for selecting said one container for displacement and registering said selection prior to operation of said conveyor,
(j) drive means for moving said assembly,
(k) means operable in response to operation of said control means upon positioning of the selected carrier adjacent said access opening to effect operation of said drive means to move said assembly to a position whereat said coupling means is brought into coupling engagement with the selected container, and
(l) said drive means being further operable upon said engagement to move said one container outwardly of said access opening away from said carrier and the other article carrying containers on the shelf of said carrier.

References Cited by the Examiner

UNITED STATES PATENTS

| | | | |
|---|---|---|---|
| 2,125,619 | 8/1938 | Parent | 312—268 X |
| 2,621,995 | 12/1952 | Zenner | 312—223 |
| 2,751,093 | 6/1956 | Theibault | 312—223 X |
| 3,105,727 | 10/1963 | Anders | 312—223 |

FRANK B. SHERRY, *Primary Examiner.*

CHANCELLOR E. HARRIS, *Examiner.*